(12) United States Patent
Evulet

(10) Patent No.: US 11,635,211 B2
(45) Date of Patent: Apr. 25, 2023

(54) COMBUSTOR FOR A MICRO-TURBINE GAS GENERATOR

(71) Applicant: JETOPTERA, INC., Edmonds, WA (US)

(72) Inventor: Andrei Evulet, Edmonds, WA (US)

(73) Assignee: JETOPTERA, INC., Edmonds, WA (US)

( * ) Notice: Subject to any disclaimer, the term of this patent is extended or adjusted under 35 U.S.C. 154(b) by 0 days.

(21) Appl. No.: 16/255,632

(22) Filed: Jan. 23, 2019

(65) Prior Publication Data

US 2019/0153948 A1    May 23, 2019

Related U.S. Application Data

(62) Division of application No. 15/368,428, filed on Dec. 2, 2016, now abandoned.

(Continued)

(51) Int. Cl.
| | |
|---|---|
| *F23R 3/52* | (2006.01) |
| *F23R 3/00* | (2006.01) |
| *F02C 7/143* | (2006.01) |
| *F02C 3/04* | (2006.01) |
| *F02C 7/10* | (2006.01) |

(Continued)

(52) U.S. Cl.
CPC ............ *F23R 3/52* (2013.01); *F02C 3/04* (2013.01); *F02C 6/12* (2013.01); *F02C 7/10* (2013.01); *F02C 7/143* (2013.01); *F02K 1/002* (2013.01); *F02K 1/36* (2013.01); *F02K 3/10* (2013.01); *F23R 3/002* (2013.01); *F23R 3/007* (2013.01); *F23R 3/32* (2013.01); *F05D 2220/32* (2013.01); *F05D 2260/211* (2013.01); *F05D 2260/4023* (2013.01); *F05D 2300/6033* (2013.01); *Y02T 50/60* (2013.01)

(58) Field of Classification Search
CPC .......... F23R 3/007; F23R 3/045; F23R 3/425; F23R 3/286; F23R 3/32; F23R 3/50; F23R 3/52; F23R 3/04; F23R 3/002; F23R 3/005; F05D 2300/6033; Y02T 50/672; F02C 3/05; F02C 3/08; F02C 7/10; F02C 7/12; F02C 7/224; F23D 14/66
See application file for complete search history.

(56) References Cited

U.S. PATENT DOCUMENTS

| | | | | |
|---|---|---|---|---|
| 2,470,184 | A | * | 5/1949 | Hans ..................... F23R 3/04 60/39.511 |
| 2,611,241 | A | * | 9/1952 | Schulz ................... F02C 3/045 60/804 |

(Continued)

*Primary Examiner* — Alain Chau
(74) *Attorney, Agent, or Firm* — Richard T. Black; PG Scott Born; FisherBroyles LLP

(57) ABSTRACT

A propulsion system includes a first compressor in fluid communication with a fluid source. A first conduit is coupled to the first compressor, and a heat exchanger is in fluid communication with the first compressor via the first conduit. A second conduit is positioned proximal to the heat exchanger. A combustor is in fluid communication with the heat exchanger via the second conduit and is configured to generate a high-temperature gas stream. A third conduit is coupled to the combustor, and a first thrust augmentation device is in fluid communication with the combustor via the third conduit. The heat exchanger is positioned within the gas stream generated by the combustor.

6 Claims, 13 Drawing Sheets

Related U.S. Application Data

(60) Provisional application No. 62/263,407, filed on Dec. 4, 2015.

(51) Int. Cl.
*F02C 6/12* (2006.01)
*F23R 3/32* (2006.01)
*F02K 1/00* (2006.01)
*F02K 1/36* (2006.01)
*F02K 3/10* (2006.01)

(56) References Cited

U.S. PATENT DOCUMENTS

| | | | | |
|---|---|---|---|---|
| 2,627,719 A * | 2/1953 | Stalker | ............... | F02C 7/224 60/804 |
| 3,603,082 A * | 9/1971 | Sneeden | ............... | F02C 3/045 60/804 |
| 4,018,043 A * | 4/1977 | Clemmens | ............... | F23R 3/52 60/39.23 |
| 4,040,251 A * | 8/1977 | Heitmann | ............... | F02C 3/08 60/804 |
| 4,084,371 A * | 4/1978 | Howald | ............... | F23R 3/26 60/804 |
| 4,549,402 A * | 10/1985 | Saintsbury | ............... | F23R 3/32 60/738 |
| 4,928,479 A * | 5/1990 | Shekleton | ............... | F23R 3/04 60/746 |
| 4,949,545 A * | 8/1990 | Shekleton | ............... | F23R 3/002 60/756 |
| 4,955,201 A * | 9/1990 | Shekleton | ............... | F23R 3/283 60/738 |
| 5,058,375 A * | 10/1991 | Shekelton | ............... | F02C 3/05 60/760 |
| 5,163,284 A * | 11/1992 | Shekleton | ............... | F23R 3/346 60/746 |
| 5,174,108 A * | 12/1992 | Shekleton | ............... | F02C 3/05 60/760 |
| 5,241,818 A * | 9/1993 | Shekleton | ............... | F23R 3/28 60/738 |
| 5,303,543 A * | 4/1994 | Shah | ............... | F01D 9/023 60/804 |
| 5,456,080 A * | 10/1995 | Shekleton | ............... | F23R 3/002 60/752 |
| 5,746,048 A * | 5/1998 | Shah | ............... | F23R 3/12 60/756 |
| 6,148,617 A * | 11/2000 | Williams | ............... | F23R 3/52 60/737 |
| 6,983,606 B2 * | 1/2006 | Brown | ............... | F02C 7/22 60/776 |
| 8,196,407 B2 * | 6/2012 | Harris | ............... | F23R 3/38 60/740 |
| 8,701,416 B2 * | 4/2014 | Teets | ............... | F23D 14/66 431/10 |
| 9,151,501 B2 * | 10/2015 | Negulescu | ............... | F23R 3/52 |
| 2004/0036230 A1 * | 2/2004 | Matsuda | ............... | F01D 9/023 277/632 |
| 2004/0045302 A1 * | 3/2004 | Brown | ............... | F02C 7/22 60/734 |
| 2006/0053801 A1 * | 3/2006 | Orlando | ............... | F23R 3/28 60/772 |
| 2008/0041059 A1 * | 2/2008 | Teets | ............... | F23D 14/66 60/737 |
| 2008/0229751 A1 * | 9/2008 | Orlando | ............... | F23R 3/28 60/736 |
| 2010/0229560 A1 * | 9/2010 | Harris | ............... | F02C 7/22 60/746 |
| 2011/0219779 A1 * | 9/2011 | Critchley | ............... | F02C 7/228 60/737 |
| 2014/0150442 A1 * | 6/2014 | Negulescu | ............... | F02C 3/14 60/772 |
| 2017/0321607 A1 * | 11/2017 | Sweeney | ............... | F02C 7/224 |

* cited by examiner

EJECTOR THRUST AUGMENTATION RELATIVE TO COMPLETE PRIMARY JET ENERGY CONVERSION.

COMBUSTOR FOR A MICRO-TURBINE GAS GENERATOR

PRIORITY CLAIM

This application is a divisional application of U.S. patent application Ser. No. 15/368,428 filed Dec. 2, 2016, which claims priority to U.S. Provisional Patent Appl. No. 62/263,407 filed on Dec. 4, 2015. The entireties of each of the aforementioned applications are hereby incorporated by reference as if fully set forth herein.

COPYRIGHT NOTICE

This disclosure is protected under United States and/or International Copyright Laws. © 2019 Jetoptera, Inc. All Rights Reserved. A portion of the disclosure of this patent document contains material which is subject to copyright protection. The copyright owner has no objection to the facsimile reproduction by anyone of the patent document or the patent disclosure, as it appears in the Patent and/or Trademark Office patent file or records, but otherwise reserves all copyrights whatsoever.

BACKGROUND

Micro-turbines have become increasingly popular for aviation propulsion. FIG. 1, an illustration of the current dominant design of micro-turbines as disclosed by Thomas Kamps, "Model Jet Engines," Third Ed., ISBN 978-1-900371-93-3, shows a centrifugal compressor with a case (21) and rotor (22); a diffuser (23); bearings and lubrication (25); a shaft (26) connecting the compressor wheel with the axial turbine (32); an annular, reverse flow combustor containing an outer liner (28) and an inner liner (29) contained inside a casing (35); a nozzle (31) to accelerate the combustion gases and direct them to the turbine (32); and an exhaust nozzle (34) to accelerate the exhaust and generate the thrust via a jet. FIG. 1 illustrates the design of virtually all hobby and small jet engines in the range under 100 lbf, albeit the same design is used also for up to 1000 lbf of thrust.

While engineers are implementing sophisticated and high-cost technologies to enable large jet engines to maximize their efficiency, present day micro-jet engines continue to lack such technology. For example, micro-jet engines are life limiting because there is a lack of turbine cooling air flow. Moreover, the size of the micro-jet engines requires them to spin at very high speeds—typically well over 100,000 Rotations Per Minute (RPM), but some approaching and exceeding 150,000 RPM. As a result of less-sophisticated technology, micro-jet engines cannot achieve demanding thermodynamic cycles that involve high firing temperatures and pressure ratios. The fuel consumption of micro-jet engines typically exceeds 1.5 lb fuel per hour and lbf of thrust, as compared to large jet engines of the high bypass type which can have fuel consumption as low as 0.5 lbs of fuel per hr and lbf of thrust.

DETAILED DESCRIPTION OF THE PREFERRED EMBODIMENT

Figure 1:
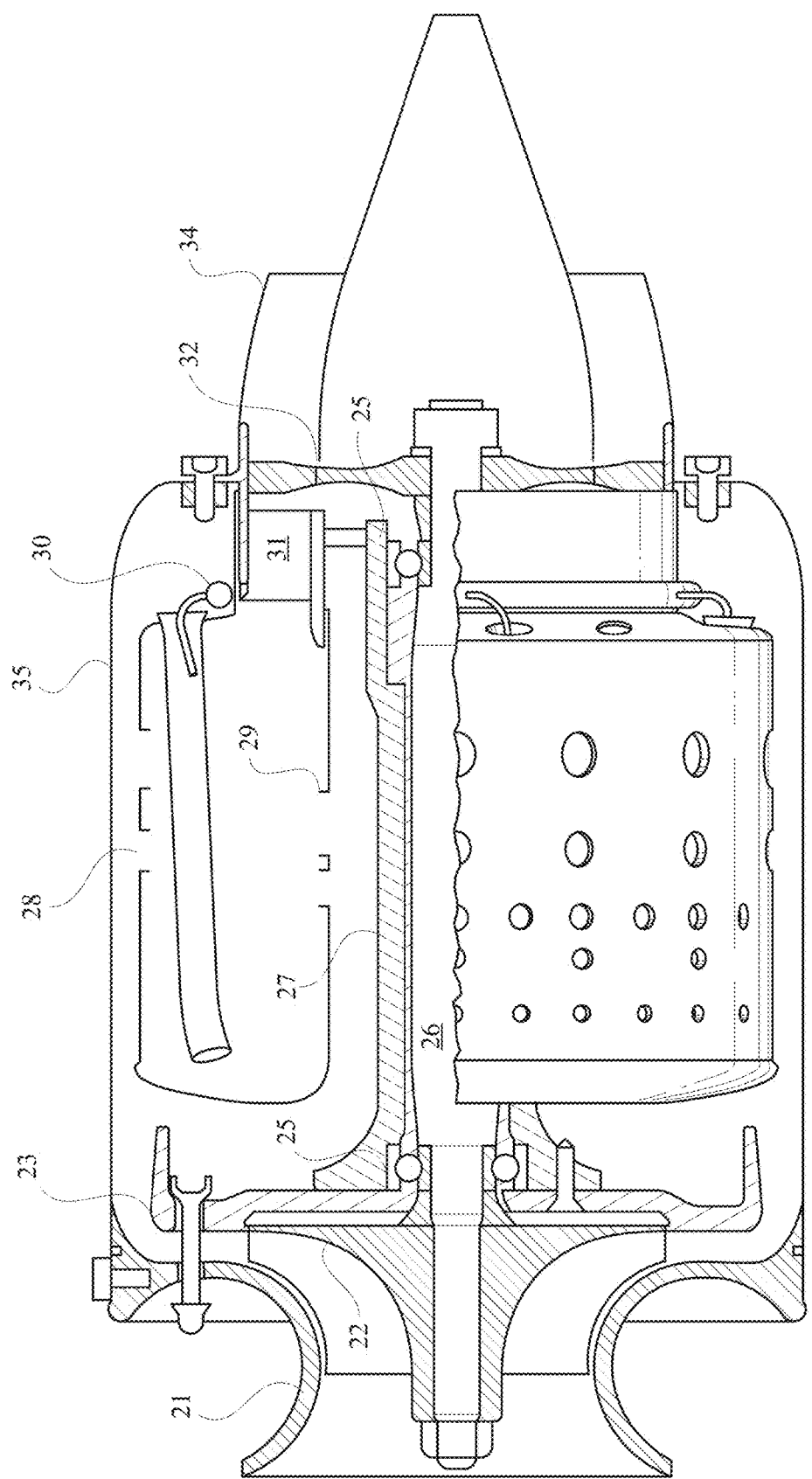
FIG. 1 illustrates in cross-section a conventional micro-turbine used in aviation propulsion.

This application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms. In addition, the headings in this application are for reference purposes only and shall not in any way affect the meaning or interpretation of the present invention.

One or more embodiments provide a propulsion system that includes some or all of the following features:

A gas generator defining at least one compressor, a combustion chamber, a turbine and a thrust augmentation device;

A first compressor defining an intake opening, at least one bleed port provided with a valve in connection with a fluid pressurized network of conduits, and one outlet to a secondary compressor or a combustion chamber or both via at least a volute and a compressor discharge conduit;

A turbine connected to at least the first compressor in a fixed manner and to a second compressor in a fixed manner or via a clutch;

A toroidal combustor that receives the air received from the compressor discharge conduit after it is preheated in a heat exchanger and gradually introduces the preheated air tangentially to the main axis of the gas generator into a sleeve formed by a scrolled casing and a mostly toroidal shaped liner via prevaporizing mixers and generating an overall circumferential movement of the air and combustion products inside a liner;

A plurality of pre-vaporization mixers of fuel and air distributed around the circumference of the combustor scroll and receiving the fuel from fuel conduits and mixing the fuel and air in Venturi passages inside the mixers;

A plurality of rectangular slots in communication with the the fuel injectors and the pre-vaporization mixers that accelerate the mixtures of fuel and air and inject them in a tangential manner towards the diametrical centerline of the toroidal liner;

A converging channel in communication with the toroidal liner and guiding the hot gases from a mainly circumferential/angular reacting flow direction to mostly axial direction and collinear to the main axial direction of the said gas generator;

The turbine receives a stream of hot gases from the combustor in the mainly axial direction and expands the gases while extracting power to drive the compressors;

A heat exchanger that receives the hot gases from the turbine and preheats the compressor discharge air, delivering it to the combustor, and guides the cooled hot gases towards a swiveling joint;

A swivel connector that transmits the pressurized hot gases supplied by the combustor outlet towards a thrust augmenting device as motive gas;

A thrust augmenting device containing a mixing section, a throat section and a diffusor, and receiving the pressurized gases to use as a motive gas to generate thrust by fluidically entraining ambient air, mixing it with the motive air and ejecting it at high velocities via the diffuser; and A series of thrust augmenting devices each containing a mixing section, a throat section and a diffusor, whereby they receive the compressed air from the compressor via the bleed valve and the fluid network and use the pressurized air as motive gas to generate thrust by fluidically entraining ambient air, mixing it with the motive air and ejecting it at high velocities via the diffusors;

The first compressor is coupled to the shaft, second compressor and turbine via the clutch and its output air is directed to the thrust augmenting devices at take-off, hovering and landing mission points and decoupled at cruise conditions;

A single compressor supplies with air both the combustor via the heat exchanger and the thrust augmenting devices via a fluid network and the compressor bleed valve to generate thrust in more than one location of the propulsion system;

The liner and the turbine consist of Ceramic Matrix Composites; and

The fluid network is in communication with the bleed valve and can modulate the flow to multiple thrust augmentation devices to assist the attitude control of the aircraft powered by the propulsion system.

A method of flying an aircraft or hovercraft may include:

Accelerating the gas generator to maximum power with open compressor bleed valves supplying several thrust augmenting devices and balancing the attitude of the aircraft by closing and opening control valves distributing said compressed air to the thrust augmenting devices and for vertical hovering, take-off and landing;

Supplying the remaining gas generator core flow exiting said heat exchanger to a thrust augmenting device as motive fluid to balance the attitude of the aircraft and generate the thrust used to vertically take off, hover or vertically land;

Balancing the gas generator speed and power with the bleed proportion of the compressor and fluid network actuation of the control valves to control the attitude of an aircraft, hovercraft or any other flying device using said gas generator;

Accelerating or decelerating the gas generator to produce more or less flow to the thrust augmentors supplied with compressed air from the compressor bleed and hot exhaust gas from the turbine;

Opening or closing the compressor bleed valve to supply or block a portion of the compressed air to the thrust augmenting devices in communication with the fluid network;

Opening or closing control valves that distribute the compressed air to thrust augmenting devices to control roll, yaw and pitch; and The ejectors contain one or more fuel injection nozzles for augmentation of thrust during short periods of time.

Embodiments of the present invention disclosed in this application relate to a micro-turbine (also known as a micro jet engine) that specifically operates as a gas generator. Rather than seeking to maximize thrust by accelerating a mass of gas to the highest velocity possible like a typical jet engine, the preferred embodiment of the present invention produces several streams of pressurized, hot gases into ejectors and creates force used in all phases of flight. In one embodiment of the present invention, a new regenerative cycle and components thereof are disclosed in this application, such as (i) a novel compressor and/or several stages of compressors that may or may not be coupled mechanically or via a clutch to the main shaft; (ii) a novel combustion system, utilizing heated air to minimize the fuel requirements to meet the specifications; and (iii) novel materials to maximize the performance, such as use of Ceramic Matrix Composites (CMC) in the components.

In another embodiment of the present invention, the turbine stage is designed to extract power without expanding the flow to close to atmospheric pressure, as would be the case in typical turbojets. Instead, the flow expands to pressures higher than those pressures typical of turbojet nozzle entry. The pressure at the exit of the turbine stage is hence higher than for typical turbojets—and purposefully so—to use in a Coanda type ejector as motive fluid. In other embodiments of the present invention, the disclosed technology allows for eliminating certain components altogether, such as the throttling nozzle to the turbine stage or a propulsive nozzle for accelerating the hot gases.

The novel gas generator is designed from the principles of centrifugal (compressor) and axial (compressor and turbine) turbomachinery. The thermodynamic cycle is of the regenerative type, with the compressor discharge air being routed to the combustor via a heat exchanger placed in the exhaust area from the turbine stage and before the exit flange of the gas generator.

In an embodiment of the present invention, several stages of compression may be applied to the air entering the system using, for example, a clutch to engage a first compressor at take-off and landing stages or when hovering the aircraft. The air compressed by the first compressor may be routed to ejectors and/or may be used for other purposes, including being directed into the intake of the secondary nozzle or used for cooling, augmentation of thrust, cabin pressurization, or other uses. As with typical turbocharger compressors, the first compressor may have at peak operation a pressure ratio preferably 2.5 or more. A valve may be present on the compressor discharge volute to direct the compressed air to either the secondary compressor or outside the gas generator, as need may be.

The second compressor may use its own air intake or may ingest a portion or all of the air from first stage compressor. This second stage compressor, similar to the first one, may employ a pressure ratio of at least 3, but preferably 5 or more. Hence, at take-off, landing or hovering, the overall pressure ratio may exceed 7.5:1.

In one embodiment, the compressor is connected mechanically to an axial turbine, and they spin at the same rate on the same shaft.

The compressed air outlet from the second compressor is routed to the back of the engine via insulated conduits at appropriate velocities, as will be described in greater detail with reference to FIG. 6, and towards a heat exchanger placed at the exit of the gas generator inside the exhaust duct. This results in increased efficiency because the heat exchanger picks up heat from the hot gas exhaust exiting the gas generator at more than two atmospheres pressure and transferring that heat to the air supplied to the combustor (in other words, preheating the air going into the combustor). The heat exchanger itself may be compact, utilizing spirals and manifolds to increase the surface area and the residence time of the compressed air so that a significant heat pickup can occur. Temperatures greater than 1000 F can be obtained before combustion. The heating of the air is advantageous because it reduces the fuel consumption of the cycle, and hence the fuel burn, by at least 30%.

Moreover, because the turbine is not cooled, current CMC materials allow for temperatures of about 2000 F (1750 F for metals) to enter the turbine (Turbine Entry Temperature or TET). Thus, in an example where there is a 1 lb/s flow, with a Pressure Ratio (PR) of 4 and a metal nozzle (1750 F maximum TET), the combustor would need to add approximately 59% of the fuel to reach the TET regenerated from 1000 F to reach 1750 F if the present invention were utilized as compared to a situation where there is no heat recovery. In addition, if better materials are used, such as a turbine manufactured with CMC materials that can tolerate 2000 F TET, the fuel efficiency can further increase another 35%. Table 1 shows the comparison of the fuel to air ratios needed to reach the same firing temperature TET in the both cases. Table 2 exemplifies a case where the heat exchanger may be fitted on a 100 lbf thrust system.

For a 1 lb/s air flow gas generator operating at 60 psia (low pressure) and firing at 1750 F, the savings per hour of flight would be significant. When used with existing gas turbines, the fuel consumption can drop from approximately 1.5 lb fuel per hour per lbf of thrust to about 0.87 lb fuel per hour per lbf of thrust. Particularly in the case of a CMC turbine, similar fuel savings can result in levels under 1 lb of fuel per hour per lbf of thrust. These efficiencies would allow a vehicle to fly longer in range and duration, or faster, or both, for the same payload. Older generation jet fuel powered turbofans such as low-bypass turbofans exhibit similar levels of fuel burn of 0.8 lb fuel per hour per lbf of thrust, lower than typical turbojets, but higher than high by-pass turbofans. This means that the present invention allows the smaller gas turbines, typically turbojets, to perform similarly to low-by-pass turbofans with respect to regeneration of the exhaust gases and introduction of better materials and tolerances.

In another embodiment, one compressor may be employed, provided that there is at least one bleed port that supplies the air used for vertical take-off, hovering, vertical landing and other maneuvers required by the mission. The bleed port can also provide the air used by the combustor and turbine. The bleed may also be extended during cruise flight for various reasons. Bleeds of up to 15% are common in large aircraft engines and a specifically designed compressor may benefit from operability with bleeds, albeit lowering its performance. With bleeds employed only in limited portions of the flight, and the bleed valve closed for most of the mission, the compressor's performance may be acceptable for unmanned vehicles as well as light airplanes.

The preheated air, typically at pressures exceeding 50 psia and over 1000 F is then directed to the combustor. The combustor in the present invention is of tangential type, with the entry of the hot, preheated air via a volute, and it is designed with significantly increased combustion residence time. The current designs in the prior art only allow for very short residence times to occur, which results in flames coming out of the turbine very often due to the combination of the short residence time and with the small space in which the combustor is crammed. The amount of time that the exothermal reaction of combustion is limited to and the

TABLE 1 to the left is the metallic version of a gas generator that fires the turbine at 1750 F., to the right is the CMC version firing to 2000 F. More than ⅓ of the fuel can be saved in this manner.

|  | Non-Regenerated | Regenerated |  | Non-Regenerated | Regenerated |  |
|---|---|---|---|---|---|---|
| T inlet Combustor [F.] | 430 | 816 | T inlet Combustor [F.] | 430 | 816 |  |
| TET [F.] | 1750 | 1750 | TET [F.] | 2000 | 2000 |  |
| Pressure [psia] | 60 | 60 | Pressure [psia] | 60 | 60 |  |
| Fuel-to-Air Ratio | 0.0198 | 0.0143 | Fuel-to-Air Ratio | 0.0241 | 0.0186 |  |
|  |  | Savings 27.7% |  |  | Savings | 23.0% |

TABLE 2 to the left is the metallic version of a gas generator that fires the turbine at 1750 F., to the right is the CMC version firing to 2000 F., as modelled with a heat exchanger that fits on a 100 lbf engine.

|  | Non-Regenerated | Regenerated |  | Non-Regenerated | Regenerated |  |
|---|---|---|---|---|---|---|
| T inlet Combustor [F.] | 430 | 1000 | T inlet Combustor [F.] | 430 | 1000 |  |
| TET [F.] | 1750 | 1750 | TET [F.] | 2000 | 2000 |  |
| Pressure [psia] | 60 | 60 | Pressure [psia] | 60 | 60 |  |
| Fuel-to-Air Ratio | 0.0198 | 0.0116 | Fuel-to-Air Ratio | 0.0241 | 0.0158 |  |
|  |  | Savings 41.3% |  |  | Savings | 34.3% | efficiency of the combustion process is far less than the typical 99.5% or more on the current large turbofan combustors, for example. With fuel not completely converted in products, and therefore, with products of incomplete combustion exiting the gas turbine, the efficiencies are remarkably low. This is another contributing factor to the low efficiencies encountered in current micro-turbines.

On the contrary, the present invention disclosed in this application allows for a very generous time for combustion via increased residence time due to the large volume of the combustion chamber itself, as well as the tangential and swirling around the combustor pattern formed by its design. While a residence time of 10 milliseconds is typical in such prior art small engines, it is not enough to ensure complete the combustion process. A residence time of over 20 milliseconds is possible via a geometry which induces a combustion process in a toroidal fashion recirculating around the axis of the combustor. With this approach, several advantages are achieved.

The fuel injection is done in a pre-vaporized manner through tubes that also employ co-flow of air so that it moves fast and rich enough locally to delay the auto-ignition. About 20% of the total air from the compressor (after bleed) is passed through the premixing/pre-vaporized tubes. At the end of each tube, a rich mixture of fuel and air emerges into the main combustion torus in a co-flow arrangement without the aid of a swirling flow. These fuel supply tubes provide long mixing lengths in order to vaporize the fuel and inject it optionally advantageously as a gas mixed with little air (a fuel-rich/air mixture).

Figure 2:
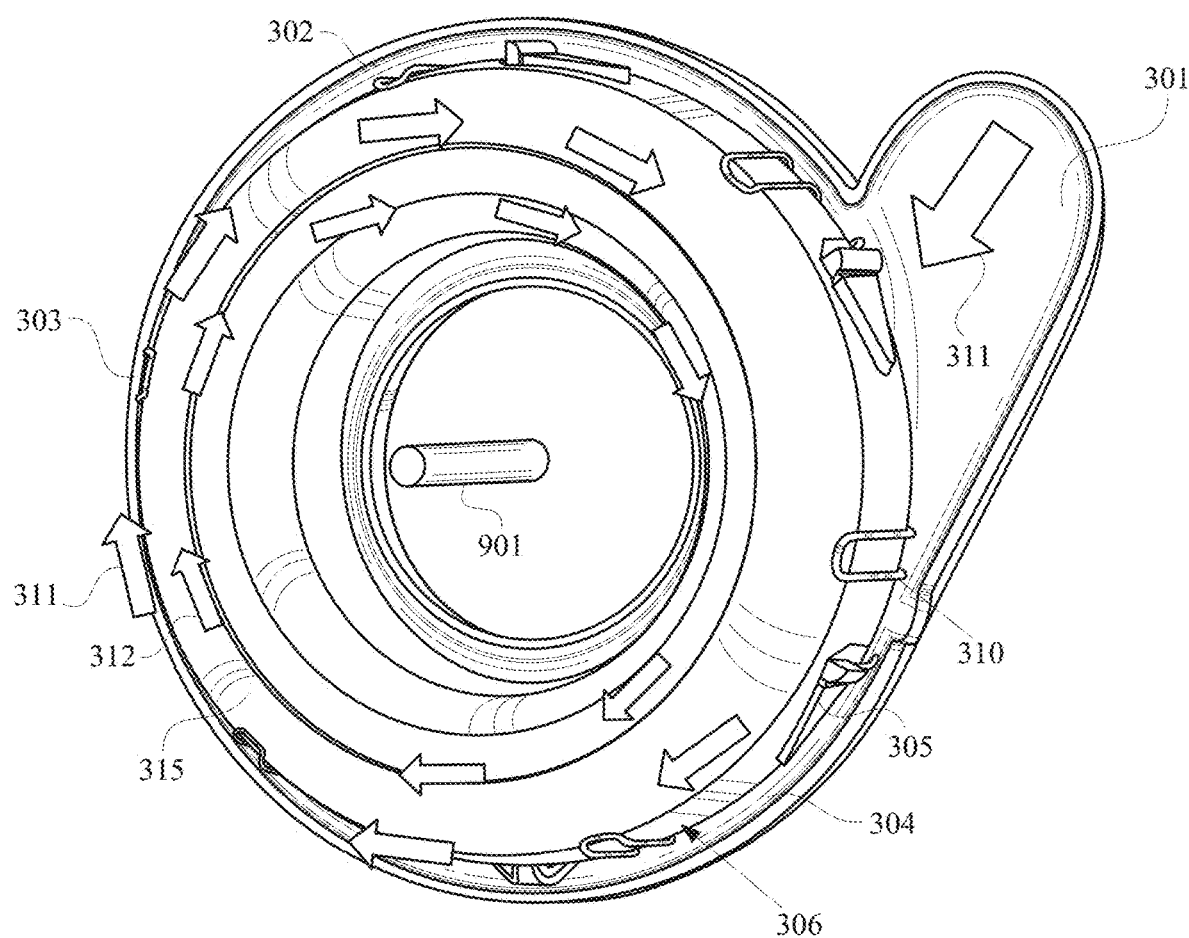
FIG. 2 illustrates in rear cross-section an embodiment of the present invention.
Figure 3:
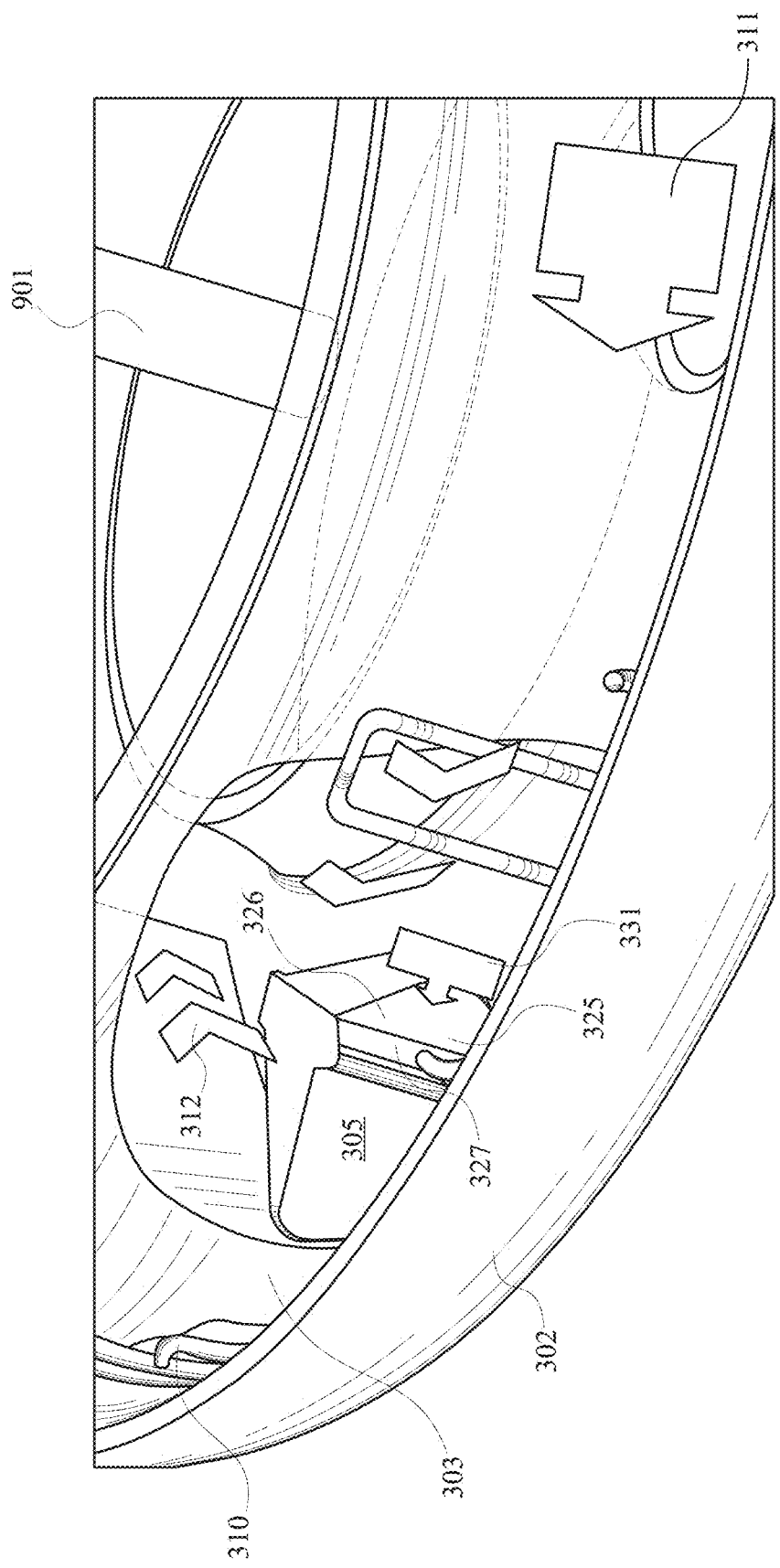
FIG. 3 illustrates in elevated side cross-section the embodiment illustrated in FIG. 2.
Figure 4:
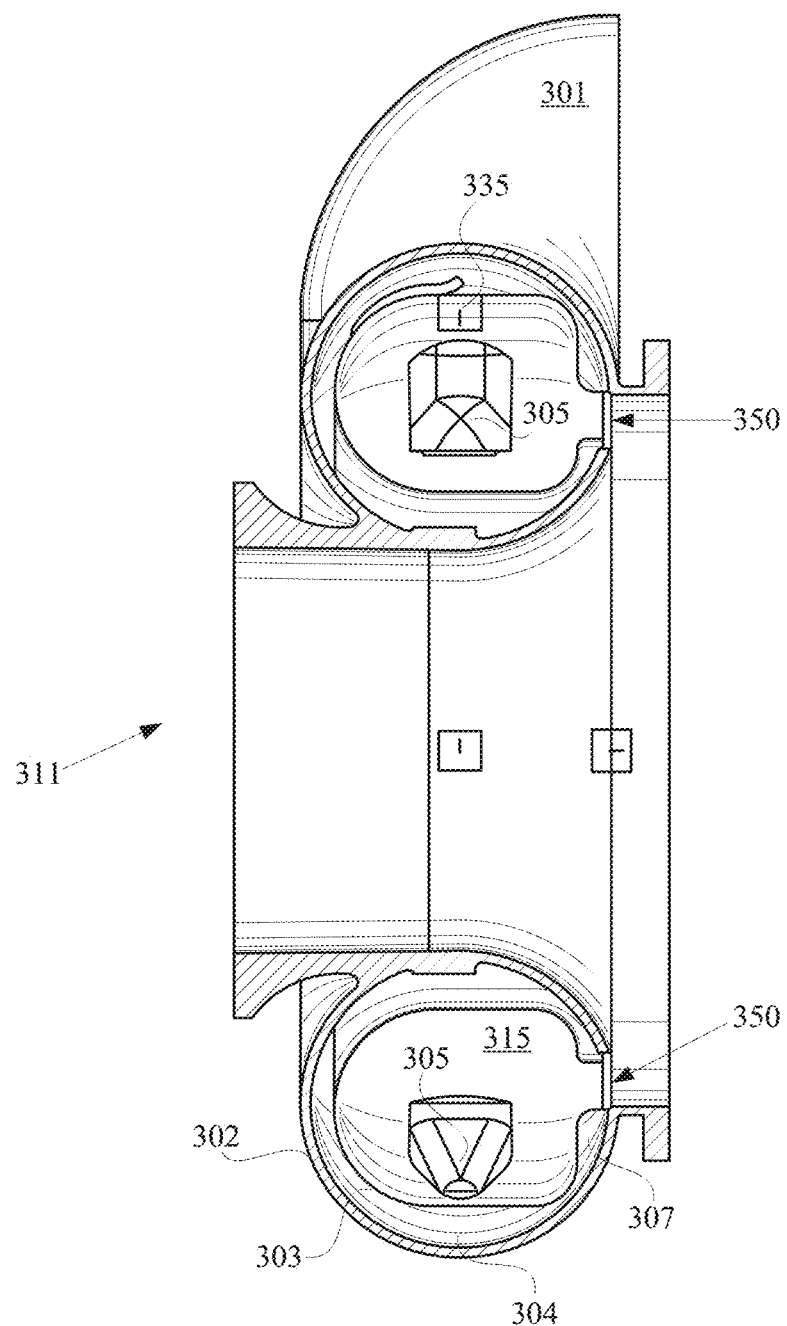
FIG. 4 illustrates in side cross-section the embodiment illustrated in FIG. 2.

The emerging fuel and air mixture then joins the general toroidal recirculation pattern formed in the combustor and assists with the projection of the flowfield in a circumferential direction. Secondary air enters tangentially and at staggered locations (in between the fueled injectors) to maintain the recirculation and to provide the hot air required for combustion and re-ignition of the fresh mixture of fuel and air, in a similar fashion as explained in papers by Kalb et al. and hereby incorporated by reference (Brückner-Kalb, J., Krösser, M., Hirsch, C., Sattelmayer, T., Emission characteristics of a premixed Cyclic-Periodical-Mixing Combustor operated With hydrogen-natural gas fuel mixtures, Journal of Engineering for Gas Turbines and Power, Vol. 132, No. 2, pages 021505, 2010). The orifices are preferably non-circular in nature, mostly slots emerging at an angle to the main axis of the combustor, and may be staggered both axially and circumferentially, as well as staged, including shut off when supplied via two fuel line manifolds, one for low and both for high power operation. Since the overall fuel-to-air ratio of a recuperated, all metallic non-cooled turbine is in the range of 0.010-0.015 (see Table 1, in which case it is 0.0116), the fuel and air mixture in the pre-vaporized tubes can be about 0.05-0.075 (near stoichiometric to fuel-rich, as the stoichiometric FAR for jet fuel is typically about 0.068). The auto-ignition at the low pressures of small engines (such as the present invention) is in the range of 15 milliseconds or more, assuming a pressure of about 60 psia and a preheat temperature of 1000 F. (See Vasu, S. S., Davidson, D. F., and Hanson, R. K., "Jet fuel ignition delay times: Shock tube experiments over wide conditions and surrogate model predictions," Combust. Flame 152, 125-143 (2008)). A residence time of less than 7 milliseconds is achievable in these premixing elements, which can be tubes or non-circular shapes, which are preferable, as shown in FIGS. 2-4. The mixing of the fuel and air in these premixing tubes does not involve any swirling movement, being purely unidirectional, and emerges in a tangential direction to the circumference of the main reaction zone of the combustion chamber at a velocity not less than 80 feet per second at nominal speed.

FIG. 2 shows a combustor 311 of an embodiment as seen from an aft position looking forward. Combustor 311 includes a first toroidal casing 302 circumscribing an engine shaft 901 and having an inlet 301 configured to receive fluid. The first casing 302 defines a first internal chamber 304 in fluid communication with the inlet 301.

Combustor 311 further includes a second toroidal casing 303, which may be made of ceramic matrix composites, disposed within the first internal chamber 304 and also circumscribing the shaft 901. The second casing 303 has an outer wall 306 defining a second internal chamber 315. The outer wall 306 has a plurality of orifices (discussed in greater detail with reference to FIG. 3) formed therethrough that provide fluid communication between the first and second chambers 304, 315. In an embodiment, the orifices are oriented at an oblique angle with respect to the outer wall 306. A plurality of fuel injectors 310 are positioned to inject fuel into the second chamber 315 through the orifices. In an embodiment, the injectors extend into the second chamber 315. Additionally, an ignition source 335 may be positioned within the second chamber 315.

Combustor 311 further includes outlet structure defining at least one channel 350 (FIG. 4) in fluid communication with the second chamber 315. The channel 350 is oriented parallel to the shaft 901. The outlet structure comprises an inner wall 307 (FIG. 4) converging toward the outer wall 306, which is configured to urge high-temperature fluid flowing about the axis of the shaft 901 within the second chamber 315 through the channel 350. As will be described in greater detail hereinafter, inlet 301 receives heated air from a heat exchanger that is heated by fluid emitted by the second chamber 315 through the channel 350.

Air, indicated by arrows 311, flowing in the first chamber 304 cools the second casing 303, and a portion of air 311, indicated by arrows 312, is introduced in a circumferential manner into the second chamber 315 via several fuel and air mixers 305 distributed around the outer wall 306. First casing 302 essentially serves as a pressure vessel and is mechanically attached in the front to a compressor casing and in the back to a turbine case. The entry and flow of the air into second chamber 315 is circumferential to the main axis of the engine, which coincides with the engine shaft 901.

The reacting mixture 312 of air and fuel flow scrubs the second casing 303 in a circumferential manner, with fresh supplies of air and fuel mixtures introduced from the first chamber 304 and injectors 310 at various circumferential locations. The injectors 310 may also preheat the fuel by immersing them in the first chamber 304 and closer to the second casing 303. The fuel picks up the heat and vaporizes before being delivered to the fuel and air mixers 305. After combusting in the second chamber 315 for several tens of milliseconds, the accelerated and completely burned gas exits the second casing 303 into a turbine, with or without the use of a nozzle, at a pre-determined angle of incidence.

FIG. 3 depicts the detailed mechanism of the introduction of the fresh, preheated air into, and structure of, the mixers 305. Slots 326 form an angle to the vertical or horizontal axes coordinate of the shaft 901 and may receive the air through a "scooping" function by a funnel 327. The air 311 scrubbing the outside of the second casing 303 is gradually admitted in small, portioned quantities 331, via the funnels 327 into the prevaporizing/mixing slots 326. Funnels 327 are disposed within the slots 326 and may extend into the second chamber 315. Additionally, the funnels 327 may taper from the first chamber 304 to the second chamber 315. The slots 326 are designed such that a diffusing section commencing at the fuel injection plane supports the rapid mixing of fuel delivered via an injector 310. The fuel has already been subjected to immersion in preheated air, hence is nearly fully prevaporized, in essence behaving like a gas being injected from a single of multiple sources at the throat section of the slot 326, rapidly mixing with the fuel to form a fuel-rich, hot mixture with the air.

The slot 326 is designed so that the residence time of the fuel and air mixes inside it before being supplied to the second chamber 315. The residence time is typically less than 5 milliseconds or less, allowing for no auto-ignition of the fuel inside the mixer 305 to occur. Moreover, the high velocity inside the mixer 305 prevents flashback to occur in these small passages. As the air is being supplied to the second chamber 315 and induced into a circumferential flow around the first chamber 304, it is cooling the first chamber as well as picking up heat, making the air at the end of the 360-degree complete revolution and final admittance into the last funnel 327 hotter than at the first funnel.

The funnels 327 may be fine-tuned and adjusted accordingly to ensure uniformity of supply to the second chamber 315 and temperature uniformity within the second chamber. The fuel flow rate supplied to each of the mixers 305 around the circumference, however, is not constant, but changes slightly to ensure uniformity and smooth operation. The ignition mechanism of the fresh mixture of air and fuel admitted from each mixer 305 into the second chamber 315 is via high temperature products of the previous, immediately adjacent mixer. As such, once ignited via a retractable or detachable ignition source 335, such as a glowing plug, the system becomes stable in the reaction down to extremely low flame temperatures, as low as 2000 F or less.

The air supplied to the combustion chamber is mainly split into the scrubbing and cooling of the second casing 303 via flow in the first chamber 304 and combustion air 331 supplied to the mixing and pre-vaporizing mixers 305. The total combustion air is hence about 60-70% of the total air supplied to the combustor 311, whereas a remaining portion is introduced in the converging section of the second casing 303, where the reacting flow is turned axially and into the turbine. The introduction of this dilution air cools the gases before entry into the turbine and to help guide the gases to a mainly axial direction, albeit with a significant residual circumferential orientation, into the rotating stage of the turbine.

The ignition of a fresh, rich mixture is propagated around the main combustion torus and it provides a reduced scrubbing of the walls if additional air, about 60% of the compressor discharge post-bleed, is injected though the inner and outer walls of the torus, at an angle that is mainly same circumferential direction with the reactive flow inside the torus, forming a protective film for the walls. The inside of the torus is then a uniform, reacting flow, able to stabilize at very low temperatures, which is exactly what is needed for turndown and avoidance of the lean blowout point. Moreover, the high temperature of the preheated air from the heat exchanger and delivered to the combustor is hot enough to keep the flame going while also cold enough to make the material withstand the loads. An external heat transfer factor is ensured by maintaining a small gap between the second casing 303 and the first casing 302 of the combustor, maintained by spacers, such that the air cooling the walls of the second casing 303 on the cold side is picking up heat and carrying it to the dilution holes located near the exit of the second casing 303. If the second casing 303 is metallic, then a film cooling may be advantageous, but if the second casing 303 is made out of CMCs, then the external cooling may be reduced significantly. CMCs are particularly very strong materials and a single shaped second casing 303 will be able to subsist in these conditions for at least 15000 cycles.

The use of the pre-vaporized fuel in the premixing tubes is in effect mimicking the use of a gaseous fuel like propane, which may be used to start up the engine, as an alternative option. Ignition is assisted by sparking plugs or pilot flames until the propane combustion process is stable and the engine is at idle and no longer assisted by a starter motor. Portable propane bottles are available, and a control logic is implemented to replace the propane (or other suitable gas) after ignition and thermal stabilization of the heat exchanger and engine. After a few minutes of operating with the gaseous fuel, and once the cycle is recovering the heat and preheating the combustion inlet air to acceptable levels, the gaseous fuel is replaced gradually by liquid fuel such as jet, Diesel, etc. The operation continues until the gaseous fuel is completely replaced by the liquid fuel, and the gaseous fuel source can be detached from the engine. Similarly, upon shut-down, any residue of liquid fuel can be oxidized in the fuel injection tubes due to the high temperatures.

The fuel turndown, in order to control the engine, can be achieved via two differently sized manifolds with each feeding an odd number of injectors. For example, with the gaseous fuel injected into one manifold for ignition on propane alone and feeding three injectors, the second manifold starts injecting liquid fuel via opening of a solenoid, while the propane supply is reduced to zero. The heat addition to the engine in this phase follows a constant value while balancing the reduction of the gaseous fuel with the increase in liquid fuel, until the gaseous fuel is completely replaced. At that point, the engine is at idle. The same liquid fuel circuit increases for acceleration, and a second transition occurs with the primary liquid fuel circuit reducing the fuel flow while the solenoid valve of the secondary liquid fuel manifold starts supplying the fuel that makes up for the acceleration curve. Above the idle point (low power) and maximum power (take-off, hovering and landing), both liquid fuel manifolds supply liquid fuel to the combustor at all times, and one of them is used to stage down as required by the mission. Additional operations with reducing flow to both circuits are also possible. The recuperator provides a constant, high temperature supply to the combustor inlet, enough to provide a stabilized operation and not become subject to combustion operability issues, including avoidance of lean blow out. This type of stabilization of the flame is known in the art, and turndown can be achieved to significant low levels due to the high thermal inertia of the system (high recuperated combustor inlet temperature throughout operation, highly uniform temperature reaction zone of the combustion process inside the toroidal liner, hot walls of the liner all contribute to a stabilized operation).

Figure 13:
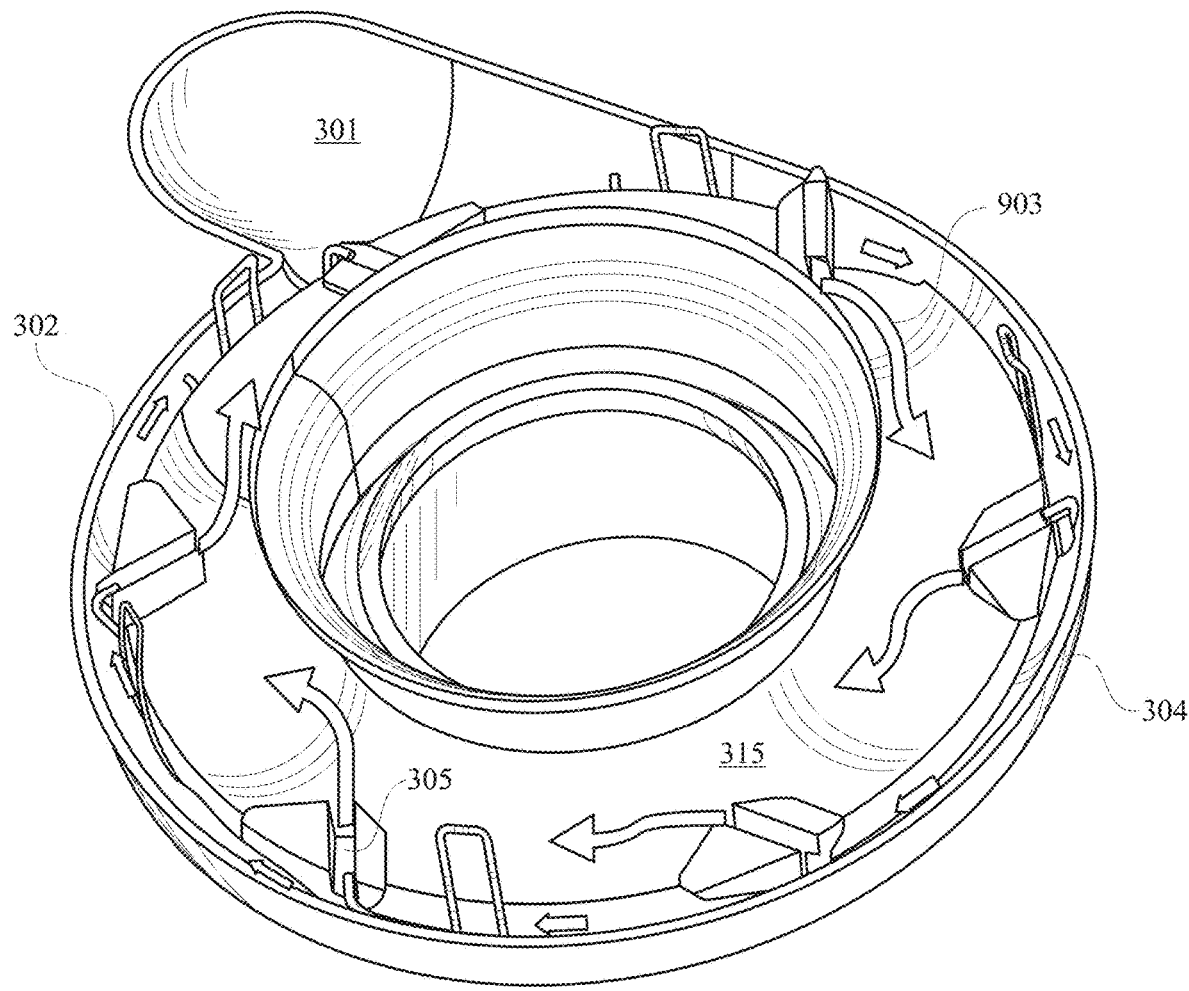
FIG. 13 illustrates in elevated side cross-section the embodiment illustrated in FIG. 2.

In FIG. 13, the admission of air from inlet 301 and mixture with fuel vapors is performed in mixers 305. The fresh mixture of fuel and air is injected at an angle into the second chamber 315, driving a circumferential overall reacting flow around shaft 901, which is also the main axis of the gas generator, constantly supplied with fresh air and fuel mixtures 903. Portions of the first chamber 304 air are introduced into the reaction zone until the entire combustion air is admitted to the combustion process. The residence time is increased due to the volume of the combustion zone and the stability of the combustion process is ensured by the ignition of fresh mixtures 903 exposed to hot gases from previous, adjacent mixer 305. The first casing 302 is designed so that a high velocity of the preheated air is maintained to cool the liner. Mixers 305 also contain fairings to maintain a low recirculation zone behind the mixers and provide lower pressure drop.

Figure 14:
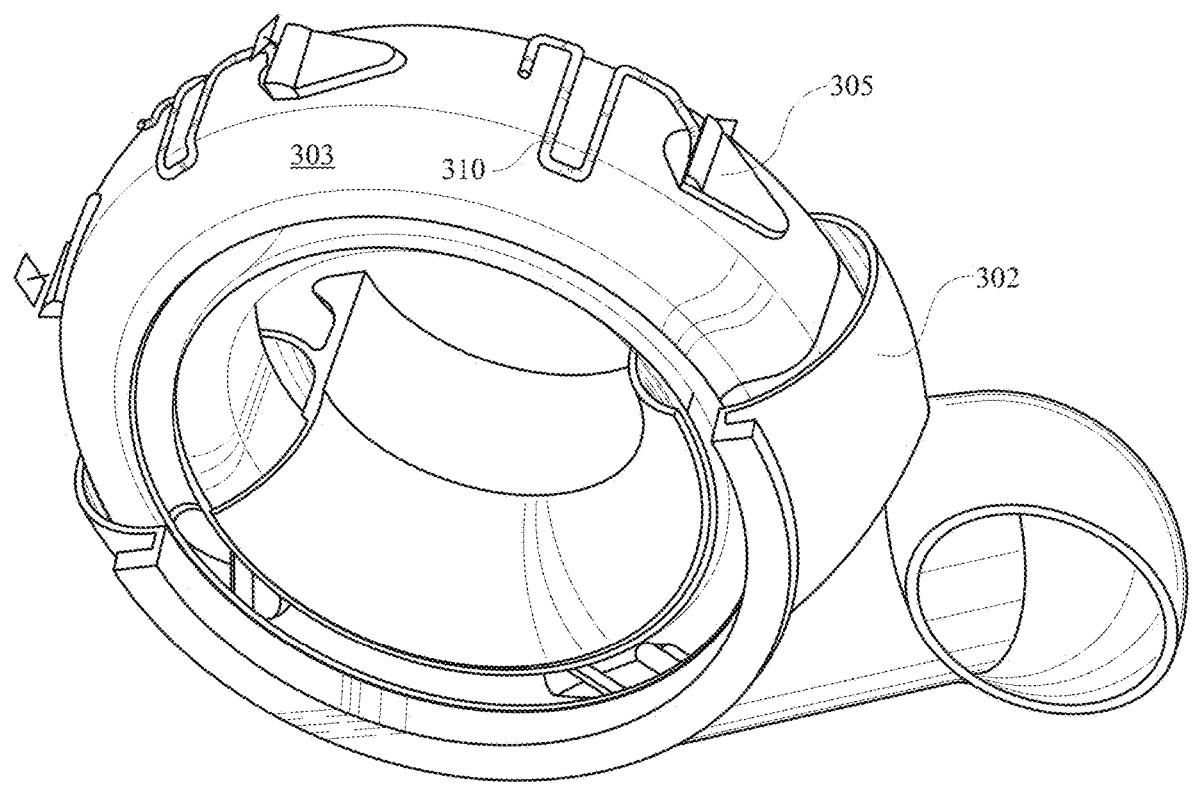
FIG. 14 illustrates in elevated side cross-section the embodiment illustrated in FIG. 2.

As illustrated in FIG. 14, the second casing 303 is located inside the first casing 302 and the fuel injectors 310 are immersed inside the sleeve formed by the second casing 303 and the first casing 302 so that fuel is picking up heat and is nearly prevaporized by the time it enters pre-vaporizing mixers 305. The second casing 303 can, due to its small size, be installed inside the first casing 302 before the final welds of the first casing 302 are performed to trap the second casing 303 inside. In addition, the second casing 303 may be manufactured out of CMC.

Figure 5:
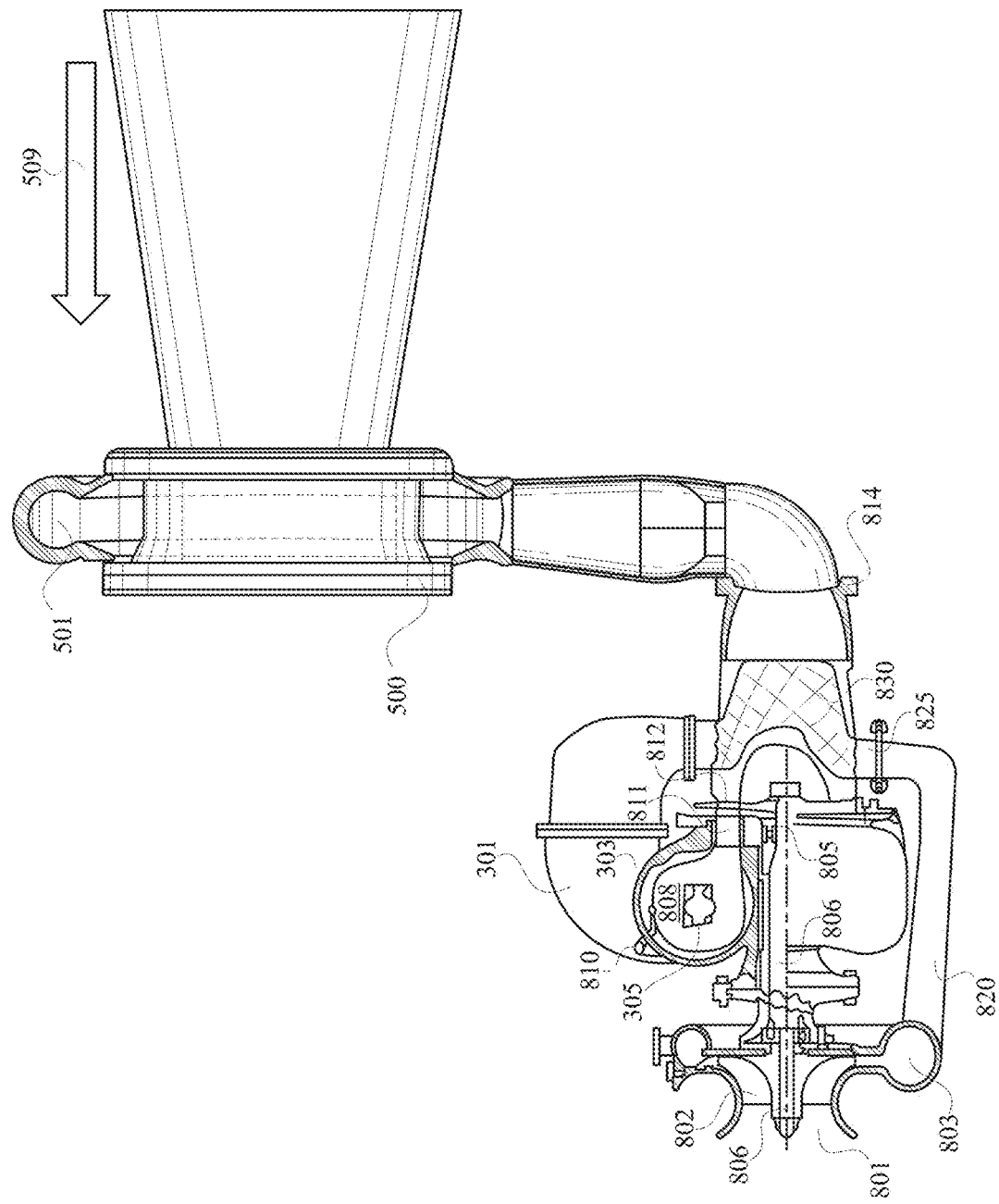
FIG. 5 illustrates schematically one embodiment of a propulsion device oriented in cruise position.

FIG. 5 illustrates one embodiment of a propulsion device including a thrust augmentation device 500 in cruise position. Through methods know in the art, the thrust augmenting device 500 can be swiveled at least 100 degrees around the axis perpendicular to an axis passing through the length of the gas generator. The propulsion device consists of a compressor shroud 801, a shaft 806, and a compressor rotor 802 discharging the air in a volute 803 and directing the flow, via a conduit 820, towards a compact heat exchanger 830. The heat exchanger 830, which may be of compact, helically coiled type, receives and preheats the compressor discharge air from inlet 825 and guides the preheated air to the heat exchanger outlet 812. The preheated air is then further guided to a combustor inlet 301 where the air is directed in a circumferential flow around the main axis of the combustor. The air is then combusted within the second casing 303 with fresh mixtures of air and fuel being supplied in a tangential direction around the circumference via mixers 305 with fuel supplied from manifold 810.

The system may or may not contain a first stage nozzle 811. In one embodiment, the nozzle is eliminated and the convergent channel guides the gases towards the turbine rotor 812, carrying some residual circumferential component of the velocity. After expansion to a lower pressure, the exhaust gas at the exit of the turbine is guided as hot gas flow toward a conduit 814 and over the compact heat exchanger 830 to preheat the compressor discharge air. The guiding, swiveling conduit 814 directs the gases while under pressure to the plenum 501 of the device 500, where the exhaust gas is used as motive fluid to generate the thrust augmentation in the direction of flight 509. Thrust bearings and their auxiliary system are represented by 805.

Figure 6:
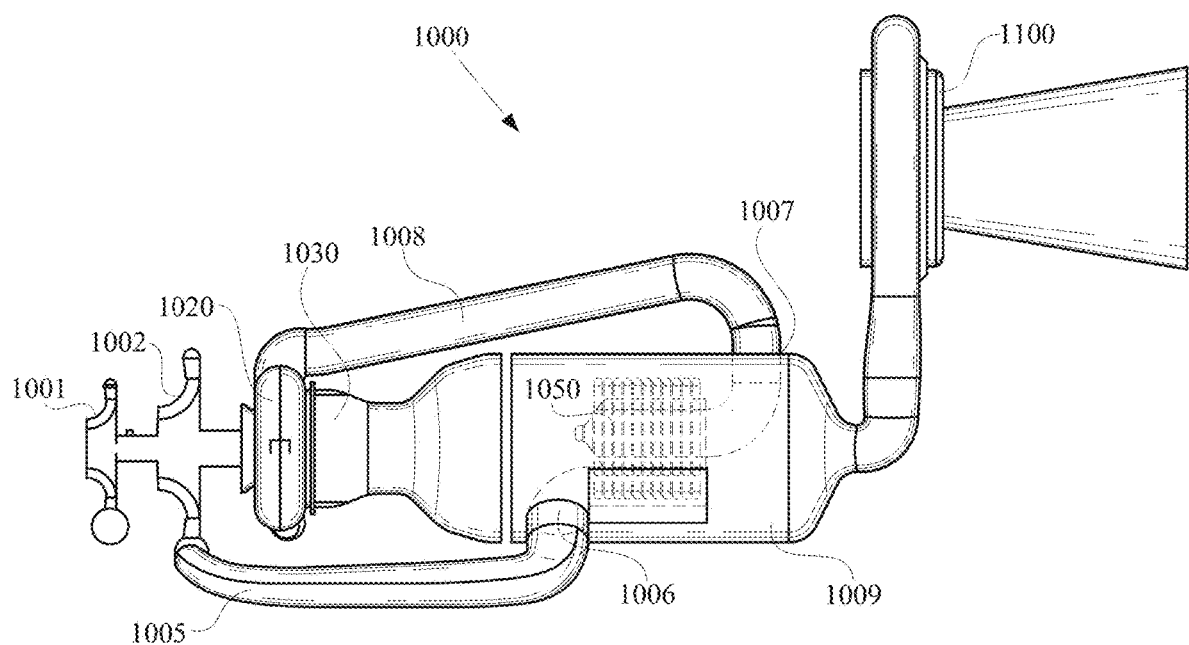
FIG. 6 illustrates an embodiment of the present invention with a helicoidal heat exchanger, two stages of centrifugal compressors, a toroidal combustor and a Coanda ejector.

FIG. 6 illustrates a propulsion system 1000 according to an alternative embodiment. The system contains multiple stages of compressors, in which the first compressor 1001 may supply air to thrust augmenting ejectors at take-off and at various stages of flight, but may be disconnected via a clutch from a main shaft during the rest of the mission. The second compressor 1002 compresses the air and then directs it via a conduit 1005 and flange 1006 to a heat exchanger 1050 positioned in the exhaust area within a conduit 1009 and intermediate a turbine 1030 and at least one thrust augmenting ejector 1100. In an embodiment, the turbine is manufactured from ceramic matrix composites. The heat exchanger 1050 uses the exhaust heat of the fluid provided by a combustor 1020 and exiting the turbine 1030 to increase the temperature of the air discharged by compressor 1002 and supplied by the conduit 1005 to the heat exchanger.

The heated air then leaves the heat exchanger 1050 and conduit 1009 via a flange 1007 and a conduit 1008 to the combustor 1020. In an embodiment, the heat exchanger is of helicoidal type. In yet another embodiment, at cruise conditions, the exhaust gas leaves the turbine 1030 at 27 psi and 1400 F, and, after transferring the heat to the colder compressor, discharge air supplied by conduit 1005 drops to 25 psi and 800 F. In this embodiment, the heat exchanger 1050 delivers the preheated air to the combustor 1020 via flange 1007 and conduit 1008, then boosts the temperature of the compressor discharge air flow at 60 psi, 400 F and supplied by conduit 1005 to the heat exchanger 1050 to at least 500 F and a pressure of 58 psi. In this way, the fuel consumption is decreased by more than 7% and possibly over 20% depending on the type and performance of the heat exchanger (see Table 3 below).

TABLE 3

Example of a 75 lbf class propulsion system employing the arrangement of FIG. 6 with various types of heat exchangers and a one-hour cruise condition flight. For extended flight times, the additional weight of the heat exchanger 1050 is hence justified, as the negative effect of additional weight is balanced by the benefit in fuel savings and cost of operation.

|  | no Heat Exchanger | Heat Exchanger 1 | Heat Exchanger 2 | Heat Exchanger 3 |
|---|---|---|---|---|
| Pressure [psi] | 58 | 58 | 58 | 58 |
| Heat Recovered Combustor Inlet Temperature [F] | 400 | 500 | 600 | 700 |
| Firing Temperature uncooled Turbine [F] | 1750 | 1750 | 1750 | 1750 |
| Fuel-to-Air Ratio | 0.0202 | 0.0188 | 0.0174 | 0.0160 |
| Fuel Savings per hour at cruise for a 75 lbf powerplant [lbs] | 0.0000 | 5.0 | 10.1 | 15.2 |
| Fuel Savings per hour at cruise for a 75 lbf powerplant [%] | 0.0000 | 6.90% | 13.87% | 20.91% |

In one embodiment of the present invention, no nozzle is used to guide the hot gases into the turbine. In another embodiment, a nozzle may be utilized for minimal re-directing of the gases. This is particularly different from most of the conventional gas turbine systems, where the gases typically need to be turned and accelerated significantly into the first stage turbine due to the uncoordinated axial recirculation processes (stirring, nested recirculations in the axial direction) that occur in combustors with pre-mixers using swirlers.

In yet another embodiment of the present invention, the use of swirlers is completely eliminated from the combustor for either stabilization of the flame or mixing.

In still another embodiment of the present invention, the combustion chamber offers a much larger residence time, different from the aviation practices utilized today, and more closely resembles the gas turbine frame combustors utilized for, for example, power generation. What typically precludes the large volume combustors to be used in aviation applications is the need of compactness and weight restrictions. The residence time in aviation applications is nearly one order of magnitude shorter than of those from power generation frames, due to the high velocities and short lengths requirements. In an embodiment, the flow of the reacting flow in a circumferential mode before the re-direction in axial direction is optionally advantageous to being able to increase the volume significantly, hence allowing for completeness of reaction and high efficiencies.

Furthermore, the lack of a first stage nozzle vane(s) eliminates weight while reducing the heat transfer requirements, while still maintaining a geometry that favors the acceleration and introduction at an angle into the rotating stage of the turbine.

The cycle and engine disclosed in this application can be specifically paired with Coanda augmenting ejectors. Since the compressor bleed air and exhaust gas emerging from the turbine are supplied as motive fluids to specialized ejectors, it may be desired to choke the motive fluid flow at the ejector itself to maximize performance and minimize the fuel burn. Significantly different from other applications, the disclosed cycle nearly chokes the passage to the turbine but stops short of doing so, and instead, chokes the flow at the exhaust thrust augmenting ejector.

The turbine receives the hot gases as described and extracts the power needed to power the compressor via mechanisms known in the art. From the turbine efflux, the gases emerge into a compact heat exchanger, where the hot gases are cooled while preheating the compressor discharge air en route to the combustor.

The heat exchanger may be of various shapes to maximize the heat transfer and endure the operation cycles. In one embodiment, the air discharge is passed through the exhaust pipe via helicoidal elements to maximize the heat recovery and minimize the pressure drop. In a preferred embodiment, the heat exchanger recovers heat to boost the compressor discharge temperatures from e.g. 400 F to 600 F and preferably to 1000 F, depending on the cycle and application. In turn, the efficiency of the cycle increases as the fuel burn is reduced accordingly. The architecture of the propulsion system allows the heat recovery to be implemented via a compact heat exchanger and a unique combustion chamber, highly integrated in the engine.

Rather than being accelerated into a nozzle, as would be the case in a traditional turbojet or turbofan, the resulting flow from the heat exchanger, now at lower pressures and temperatures compared to the entry section in the heat exchanger, but still at higher values than the ambient pressure and temperature, respectively, is delivered to and accelerated into the primary nozzle of an ejector, near or at choking conditions. In one embodiment, a Coanda ejector uses the emerging gas from the turbine to provide a thrust by entrainment of ambient incoming air at all points of the mission as the primary nozzle of the ejector is connected via conduits to the turbine efflux. The ejector may or may not swivel to allow for vertical take-off, landing and hovering, as well as level flight propulsion.

Figure 7:
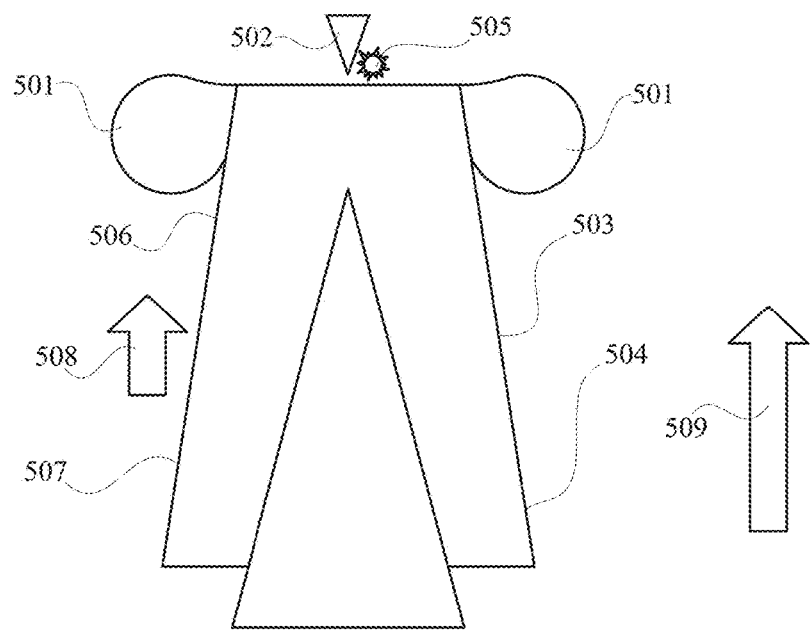
FIG. 7 illustrates a Coanda nozzle propulsion system with augmenter.

FIG. 7 illustrates a Coanda nozzle propulsion system combustor augmenter. At the exit of the combustor liner toroidal structure, a small opening turns into a convergent, annular channel accelerating the flow into the axial direction towards the turbine. Because of the high rotational nature of the circumferential flow inside the torus, the straightening of the flow into axial direction is not fully achieved nor desired. With the appropriate geometry, the need for a nozzle to accelerate the flow and guide it into the rotating axial turbine disappears. The turbine nozzle (also known as the first stage nozzle) is eliminated. The residual movement of the reacting flow, further facilitated by the late injection of dilution holes, is sufficient to guide the flow to the turbine rotor blades at the appropriate angle. This embodiment does not choke the flow at the exit of the combustor and inlet into the turbine; rather, the choking of the flow occurs at the exit of the gas generator (the location of the specialized ejector of the Coanda type) as explained herein. In this embodiment, the hot exhaust flowing from the turbine still has a high pressure and temperature such that it can be used as a motive fluid for the ejector to entrain air and augment the stream's thrust by 25-75% when compared to the baseline thrust of the original turbojet.

The turbine itself may be manufactured from a CMC or metallic-based materials. Cooling may or may not be employed. In one embodiment, the CMC made turbine blades can withstand 2000 F inlet temperatures (firing temperature) without the need of cooling and can extract the work needed to drive the compressor between pressures of 4 to 2 bar (60 to 30 psia) at take-off and hovering conditions. At that operating condition, the compressor bleeds roughly 20% of the flow to forward ejectors, and the remaining 80% flows through the compressor and is preheated to 1000 F by exhaust gases from the compressor discharge using the heat exchanger. The combustor fires at 2200 F inside the CMC liner and the hot stream is diluted to 2000 F TET. A gas turbine as described herein could produce, for example, 500 lbf at take-off using 5 lb/s air, bleeding 25% of that and at an efficiency of 30% at take-off and in higher 30s % at cruise conditions. The take-off condition may also be used for further augmenting the thrust by injecting fuel directly into the center of the Coanda nozzles, thereby generating a very large amount of thrust at lower efficiency for a short burst via a pseudo-ram effect, followed by the transition to cruise condition when bleeds are closed on the compressor and the efficiency increases to approximately 40%. In this embodiment, the pseudo-ram effect is generated by the vacuum created in front of the Coanda ejector, which may be used to entrain vast amounts of air of at least 10:1 entrainment ratio. At the same time, the Coanda ejector entrained air and its wall jets assists with the atomization of the fuel injected in its middle and can autoignite the fuel and air within the diffuser section, generating additional thrust in the process. Ignition of the fuel and air mixture inside the diffuser is achieved by a pilot flame or a sparking plug, where the flame stabilization is away from the walls of the diffusor in the areas of lower velocities of the Coanda diffuser (see FIG. 5).

In FIG. 7, the plenum 501 of the Coanda ejector 500 introduces pressurized fluid which can be compressed air from the compressor bleed or exhaust gas at higher than ambient pressure as motive air into the ejector, forming a flow pattern resulting in thrust 508. A fuel injector 502 is placed in front of the Coanda ejector 500, away from the inlet but into the low-pressure area impacted by the operation of the Coanda ejector. The injector 502 sprays/injects liquid (or gaseous) fuel along the main axis of the Coanda ejector 500 in the shape of a spray or fuel jet 506. A pilot flame or torch or spark igniter 505 ignites the mixture, and the flame 507 propagates downstream, being sucked in by the ejector 500, however stabilizing itself away from the walls 503 of the diffuser, which are protected from direct touch with the flame via the very high velocity wall jets 504. Because the local axial velocity in the center is equal to the turbulent flame propagation speed in the direction of fuel injection, the flame front stabilizes, releasing heat that generates more thrust 509. If the fluid in plenum 501 is hot, pressurized exhaust from a gas turbine, the fuel and exhaust gas may be autoignited at contact with the gases, by orienting the spray accordingly. The operation is intended to be performed for small duration, e.g. VTOL or STOL, hovering or emergency.

Figure 8:
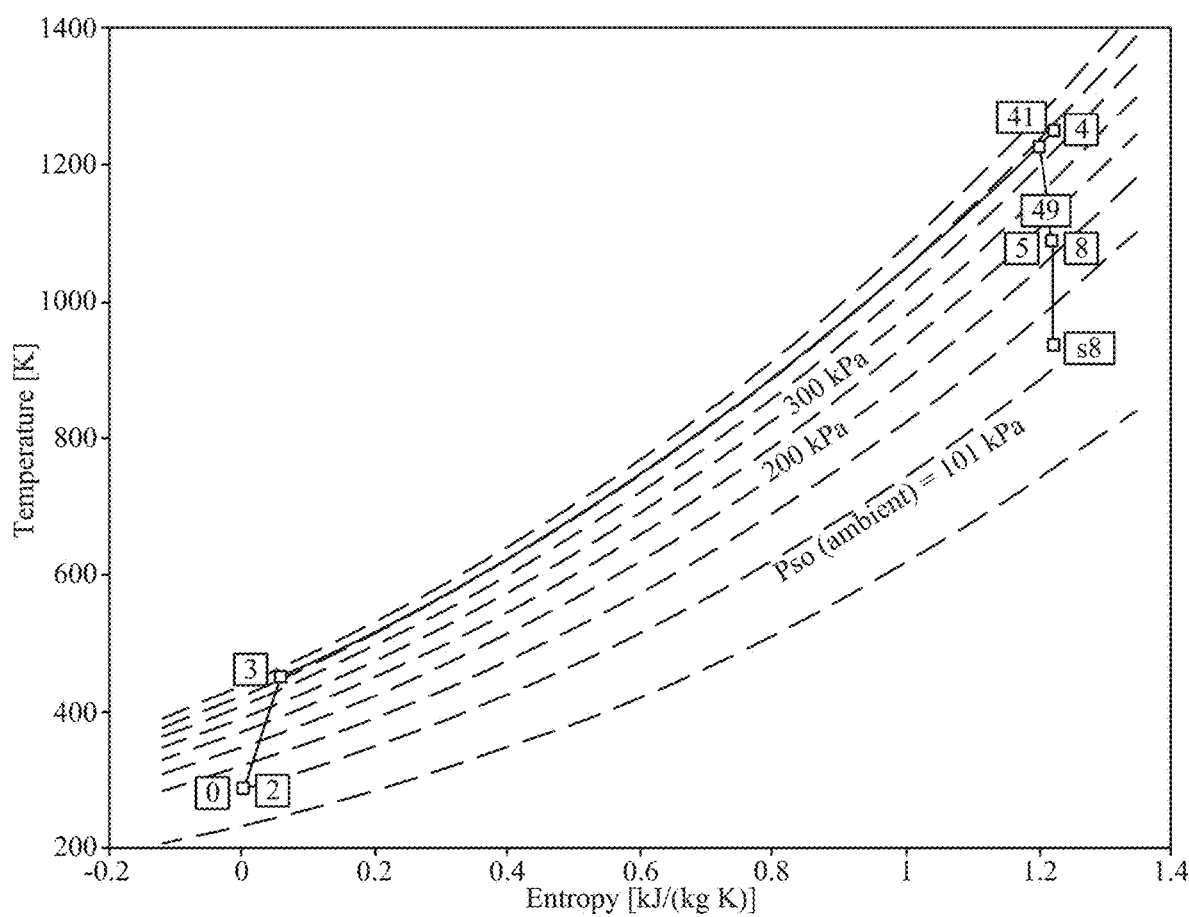
FIG. 8 illustrates the thermodynamic cycle of a conventional mini-turbojet.

Conventional jet engines employed in small aerial vehicles less than 1000 lbs in total weight are commonly turbojets or jet with very low bypass ratio, such as those employed by Williams International (U.S. Pat. No. 4,598, 544) or manufactured by hobby suppliers such as Jetcat or Jetbeetle. FIG. 8 depicts the results of the modeling of a turbojet engine similar in size with a Jetcat model as compared with an embodiment of the present invention.

In FIG. 8, the turbojet has a specific fuel consumption of 30.9 g/(s-kN) or 1.09 lb fuel/lbf-h, in order to produce a thrust of 300 N or 67 lbf. The present invention implements a heat regeneration unit in the jet engine to recover the heat and reduce the consumption of the fuel by at least 25%, so the thrust specific fuel consumption can drop accordingly to 1.09*75% or 0.8175 lb fuel/lbf-hr. For a two-hour mission of an unmanned aerial vehicle with a thrust requirement of 300 N on average can use roughly 110 lbs of fuel (or about 18 gallons) while the conventional turbojet would require 146 lbs of fuel (or 25 gallons) for the same mission. This would result in savings of 22 miles per gallon of fuel for the present invention versus 16 miles per gallon for the conventional turbojet.

The implementation of the heat exchanger can further be improved by the introduction of thrust augmenting ejectors to the cycle.

Figure 9:
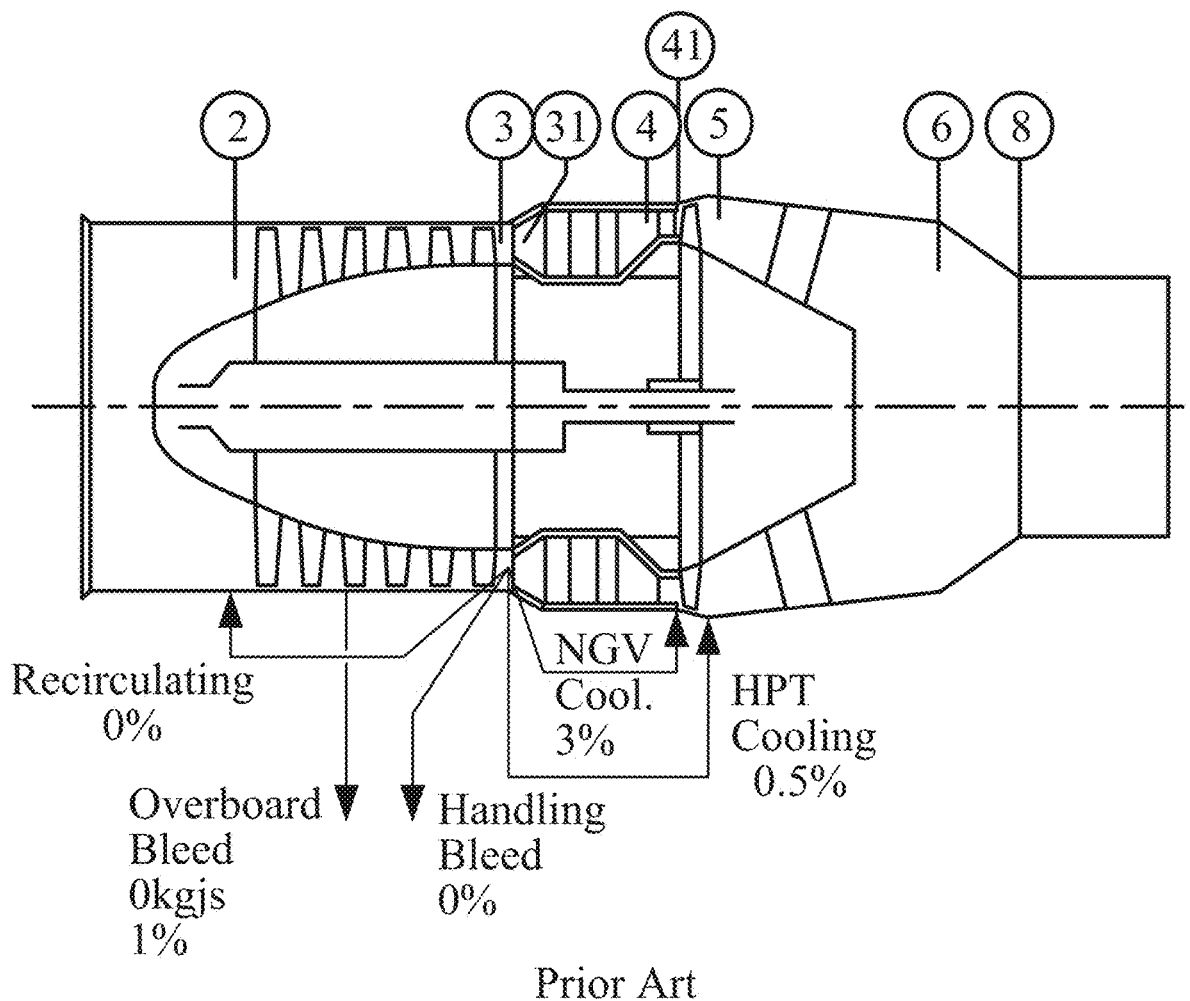
FIG. 9 illustrates a conventional turbojet.

FIG. 9 illustrates a conventional turbojet. One or more embodiments of the present invention differ from the turbojet shown in FIG. 9 in numerous ways. First, the compressor is bled at take-off, hovering and landing by roughly up to 25% to feed a 2:1 thrust augmenting ejector described within this application. The bleed valves are marked handling bleed and can be closed at cruise condition and re-opened at hovering and landing, according to the mission.

Second, the compressor discharge air at section 3 is routed through a heat exchanger that is located within the exhaust section past the turbine section 6. The unit is called heat regeneration unit and allows the exhaust gases to heat up the combustion air prior to its delivery to the combustor.

Third, the flow from section 3 to section 31 is modified to allow the introduction of a heat exchanger to recover some of the exhaust heat.

Fourth, the combustor adds heat for a smaller temperature difference compared to the original turbojet, due to the heat exchanger. The increase in the temperature between the combustor inlet temperature and the outlet form the combustor is typically 400 F or 475 K, resulting in 25% reduction of the fuel needed by the cycle, and maintaining the same inlet temperature to the turbine (see Tables 1 and 2).

Fifth, the combustor exit section carries some residual circumferential motion of the gases, and does not necessarily employ a traditional first stage nozzle to accelerate the gases. Rather, a converging section can introduce the exhaust gases to the turbine rotor stage.

Figure 10:
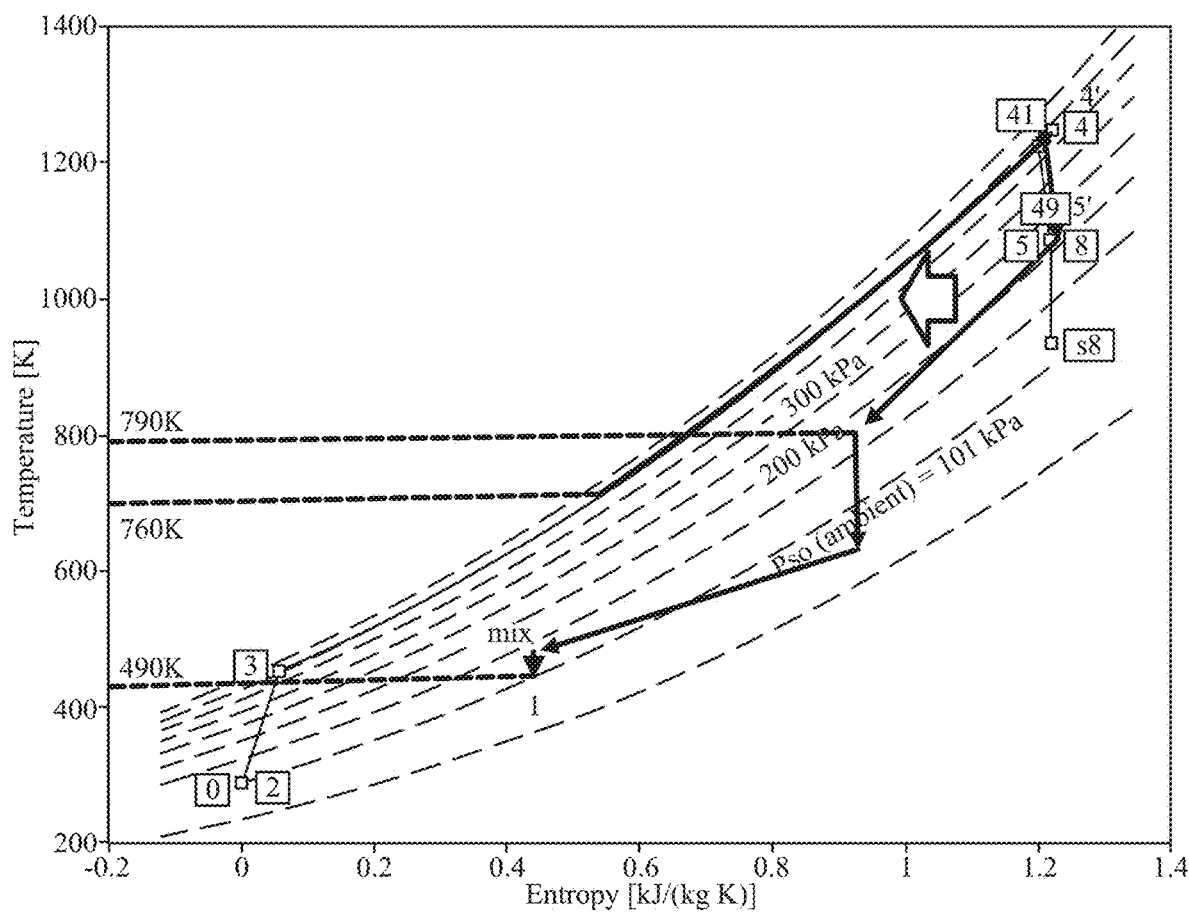
FIG. 10 illustrates the thermodynamic cycle when modified with a regenerative heat exchanger and ejector.

Sixth, the turbine is designed such that it expands the exhaust gas to higher than atmospheric pressure, preferably above 1.1 pressure ratio compared to ambient conditions; FIG. 10 (in comparison with FIG. 8) shows that the expansion process ends somewhere between 1.5:1 and 2:1 pressure ratios. Compared to the ambient pressure, this enhances the heat exchanger performance of the heat regenerator represented in FIG. 11 and leave room for the use of the ejector at the exit at section 8.

Figure 11:
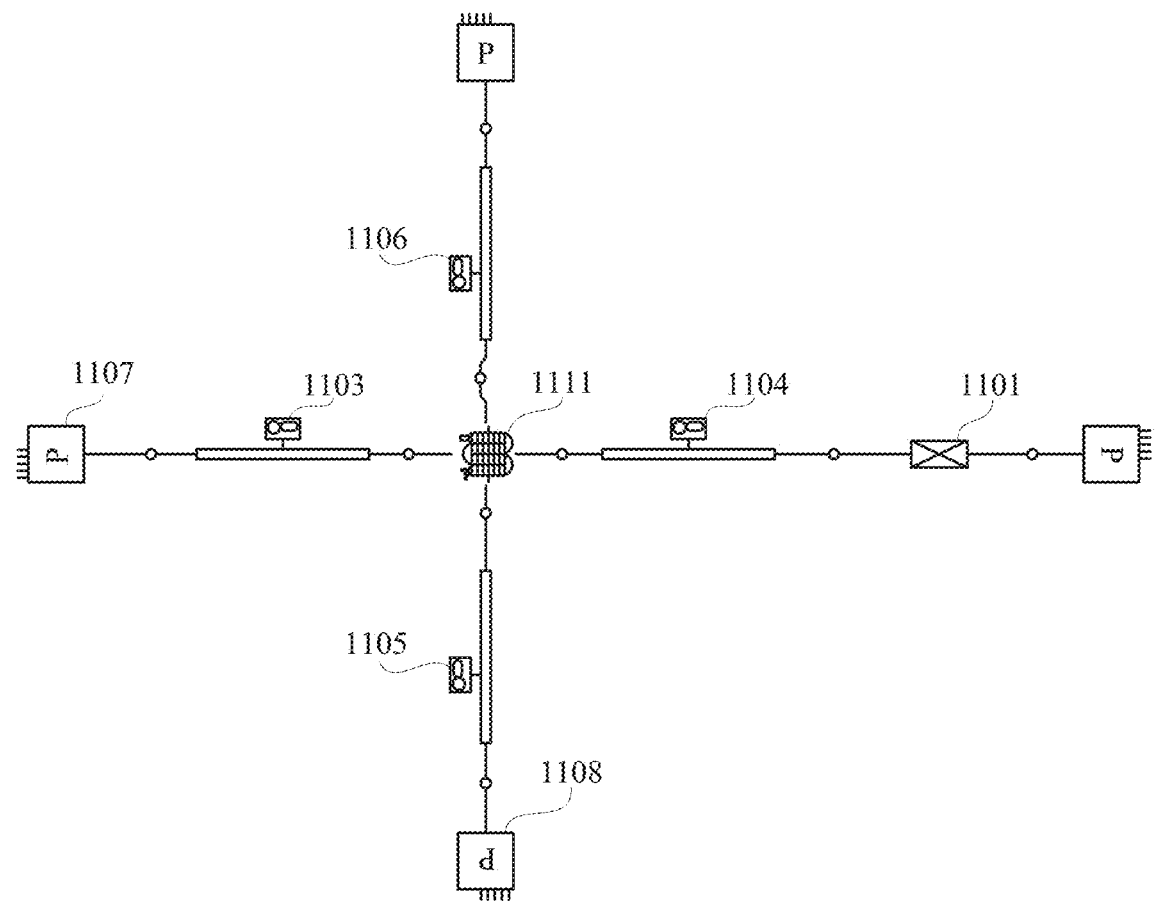
FIG. 11 illustrates the heat exchanger streams.

Seventh, the heat exchanger, which preferably is of the coiled or counterflow type, recovers the heat and transfers a portion of it into the fresh combustion air stream, while dropping the exhaust heat temperature between sections 5 and 6. FIG. 11, one embodiment of the present invention, shows the exhaust gas temperature of the hot side gas provided from section 1105 after the turbine is 1400 F and 26.5 psi at element 1106, before the heat exchanger and 944 F and 17 psi after the heat exchanger at element 1107 of FIG. 11. The heat exchanger 1111 raises the temperature of the compressor discharge flow supplied from the compressor discharge plenum 1108 and supplied via conduit 1105 at 426 F and 60 psi. After the heat exchanger occurs, the fresh, recuperated compressor discharge air reaches 856 F at 53.5 psi, before being introduced to the combustor described in the sections above. In the combustor described in FIGS. 2-3 and text above, the temperature is being raised to, for example, approximately 2000 F before introducing the flow to the turbine. The power extracted by the turbine from 52 psi and 2000 F to 27 psi and 1400 F (plenum 1107 in FIG. 11), combined with the respective efficiencies known in the art for turbomachinery components, balances the need for the compressor power input. The rise in temperature of the fresh air exiting the heat exchanger reaching 430 F would result in considerable savings of the fuel used in this thermodynamic cycle. The other stream exiting the heat exchanger also contributes to reducing the losses, as it is rejected at much lower temperatures than the original value of the turbojet cycle, e.g. 944 F (780K) instead of 1500 F (1090 K).

Eighth, following the same sample calculations above, the exhaust stream from the heat exchanger exits the heat exchanger at 17 psi and 944 F and is directed next not to a simple nozzle, as shown in the FIG. 9 at section 8, but instead to a specially designed ejector, where the said exhaust stream is used as motive air. Testing data indicates an augmentation ratio of >1.25 for a pressure ratio of <1.25 for an axisymmetric ejector and an augmentation ratio of over 2 for a flat ejector for a pressure ratio of <1.5. Hence, the thrust augmentation expected from the conditions described above is between 1.25 and 2.0 for the present invention and for very small pressure ratios required.

Ninth, the thrust augmentation can produce between 67*1.25=84 lbf and 67*2=134 lbf. In comparison, the reduction of the flow to achieve the same level of thrust needed would be 0.454 kg/s (1 lb/s)*0.80 (i.e. 20% less flow) for the same thrust needs, and the same fuel-to-air ratio to match the cycle conditions including the TET.

FIG. 10 illustrates the thermodynamic cycle when modified with a regenerative heat exchanger and ejector. The heat regeneration transfers heat from the turbine exhaust stream and reduces the amount of heat addition required by the combustor. The combustion heat addition evolution becomes 3'-4. The turbine expansion process also changes to a 4'-6' evolution, providing enough power to run the compressor. The heat exchanger determines the evolution to point 8' on almost an isobaric process, followed by the ejector evolution 8'-s8' in isentropic manner, in the primary nozzle of the ejector. At the end of the evolution, when the pressure has dropped to s8', the mixing process begins with the secondary fluid, which is the ambient air, evolution s8'-mix. The point called 'mix' is at a slightly higher pressure than ambient, and the final evolution is a nearly isentropic expansion of the flow to the ambient exit static pressure.

The various embodiments of the present invention disclosed in this application, including the regenerative cycle and the reduction in flow combined with the introduction of the ejector technologies can generate fuel savings of more than 25% and a smaller rotating core. As such, an aerial vehicle may achieve more than 25% more miles per gallon when compared to the turbojet, without the use of large fans or other moving parts. The fuel consumption can be dropped according to the present invention to less than 0.7 lbs fuel per pound force and hour, allowing an aerial vehicle powered by the system disclosed in this application to travel 400 miles on less than 90 lbs of fuel, or roughly 27 mpg.

FIG. 11 illustrates an example of the heat exchanger streams, which include: the exhaust from the turbine into plenum 1107 and flowing through conduit 1103 to the heat exchanger at 1400 F and 26.5 psi and exiting the heat exchanger 1111 through conduit 1104 at 944 F and 17 psi; the fresh compressed air from the compressor at 426 F and 60 psi is supplied at plenum 1108 and flows through conduit 1105 to the heat exchanger 1111, exiting via conduit 1106 to the combustor at 856 F and 53.5 psi; and, as represented by element 1101, the motive fluid nozzle (primary nozzle) of the ejector that is permanently connected to the system. The conduit supplying element 1101 in FIG. 11 is the element 501 in FIG. 7.

An optionally advantageous element in one embodiment of the present invention is the use of a compressor that employs bleed valves. The opening of the bleed valves during operation results in a drop in pressure and lowers of the working line, away from the stall line. While the pressure drops, the compressor can still be accelerated and the flow can be increased, albeit at lower efficiencies. If the bleed flows are used for non-propulsive reasons (cabin pressurization, overboard bleed, etc.), then the specific fuel consumption increases because the compressed air, for which power was consumed, is not contributing to generating thrust. However, if the bleed flows are used for thrust augmentation at 1.5-2.5 times the thrust otherwise obtained with the same flow via expansion through a nozzle at the end of the cycle, the bleed can contribute significantly to the thrust and particularly to the vertical thrust required in vertical take-off and landing applications. The present invention allows the system to be flexible and engage the compressor bleed powered thrust augmentation ejectors at various stages of the flight. If the intention is to operate the bleed valves fully open at vertical take-off and landing in order to power the thrust augmentation ejectors, as well as hovering, the fuel consumption may accordingly increase. However, since for most applications, this may be a small portion of the mission, the opening of the valves to allow these maneuvers is acceptable, and bleed valves supplying ejectors may be closed or minimized at cruise conditions.

The operation with open bleed valves on simple compressors such as the small turbojets used in hobby applications, i.e. less than 300 lbf thrust, is impacting the TET because the TET is limited due to materials capabilities and less air is supplied to the combustor in case of the bleeding. It is, however, possible to operate the turbine for a limited amount of time at exceeding temperatures compared to nominal values without significant impact to the maintenance interval of the system. Moreover, recent advancements in materials science and the introduction of CMCs to the combustor liners and turbine nozzles and rotors allow the possibility to exceed the turbine inlet temperatures several hundreds of degrees over the similar metallic turbines without significant impact on the life of the turbine.

The overall performance of the system depends on the efficiency of the thrust augmenting ejectors as well. Simply bleeding off the compressor stream has demonstrated that using a simple nozzle instead of an ejector can achieve 2-3 times the entitlement. In one embodiment, the system is sized for 1 lb/sec air flow at maximum speed, 4:1 pressure ratio, 10% compressor bleed powering "cold" ejectors in the front of the system, and 90% hot gas supplied to an exhaust (also known as the "hot" ejector). The cold ejectors produce 11 lbf thrust (i.e. 110 lbf/lb/s) and the remaining 90% of the hot flow produces 100 lbf/lb/s resulting in 90 lbf of thrust. The additional thrust boost resulting from the fuel injection in the thrust augmentation ejectors (as disclosed herein) results in the boosted thrust increasing to 20 lbf for the cold ejectors and 150 lbf for the hot ejector. The conventional hobby turbojet produces only 50 lbf of thrust, so without fuel injection, the described ejectors can augment the thrust by (11+90)=101 lbf, more than doubling the thrust for the same amount of fuel consumed. The result is a fuel burn savings of more than 50% compared to the original product. The additional fuel injection in the thrust augmentation ejectors reduces the fuel efficiency and conversely increases the fuel consumption for a small duration of the mission, such as take-off or hovering or landing. However, the thrust augmentation becomes 170 lbf versus the original 50 lbf, which can be also vertically directed for vertical take-off, hovering or landing, or assisting for Short Take-Off and Landing (STOL.)

Figure 12:
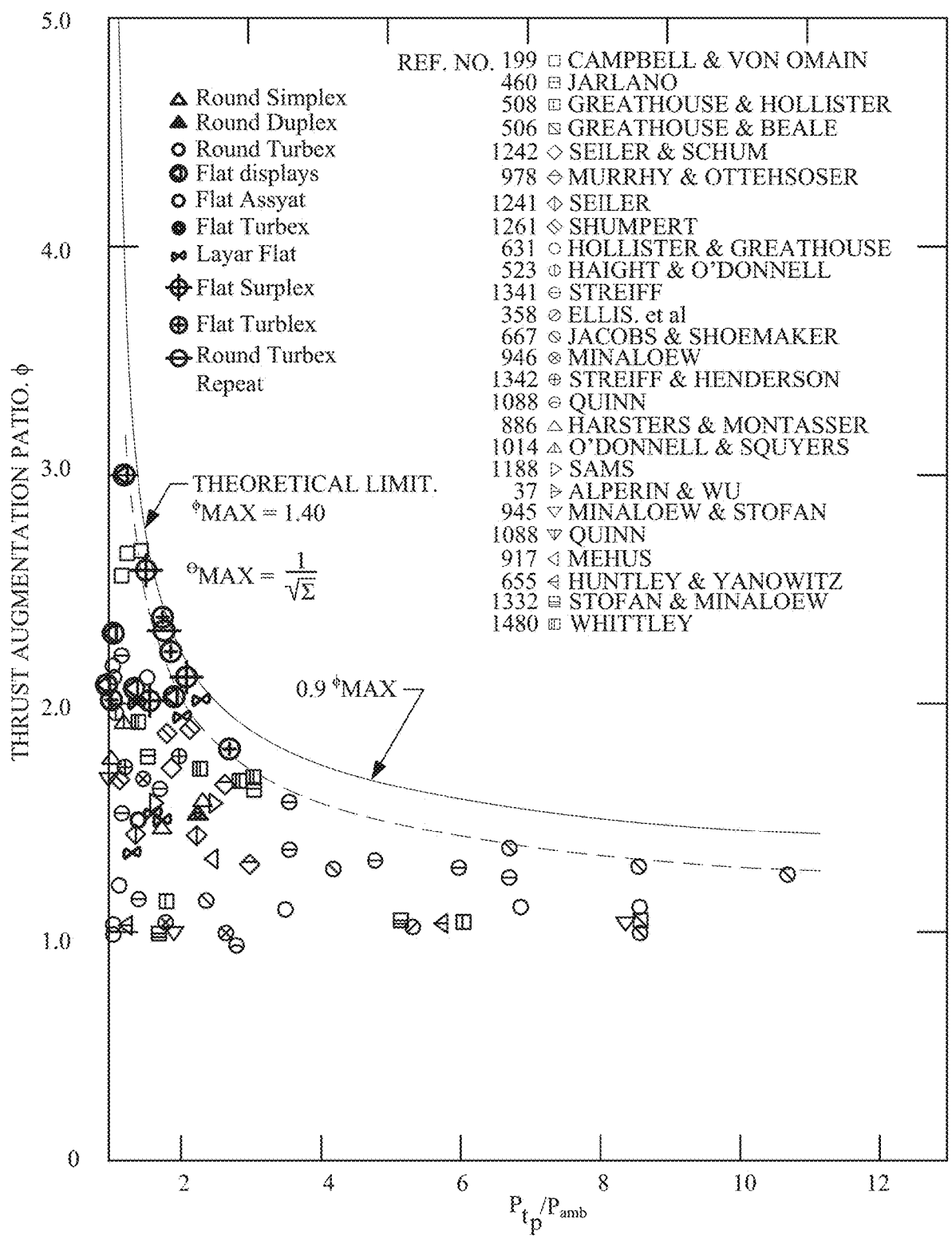
FIG. 12 illustrates the ratio of augmentation obtained through experimental data using the augmentation devices disclosed in this application as compared to the pressure ratio of the exhaust gas supplied to the plenum and ambient pressure.

The device augments the thrust between 1.25-2.0 times the otherwise simple expansion to the ambient. FIG. 12 illustrates the ratio of augmentation obtained through experimental data using the augmentation devices disclosed in this application as compared to the compilation of other ejectors in the NTIS publication ADA098620 of the Vought Corporation Advanced Technology Center, published in September of 1979.

As shown in FIG. 12, the thrust augmentation performance of the present invention is in the range 1-2 pressure ratio ranges between 1.5-3, outperforming most other ejectors in the prior art. At maximum speed of the compressor and maximum power of the present invention gas generator, it is expected that the hot exhaust gas can produce at least 50% more thrust than the original small turbojet simple exhaust nozzle, and the thrust augmenting device (element 500 in FIG. 5) of the invention can be oriented for vertical take-off and landing, and/or hovering, making the use of the gas generator. Moreover, the compressor bleed flows can be conveniently directed through a network of conduits to swiveling thrust augmenting devices that can produce between 2-3 times the thrust of the simple turbojet propelling nozzle. If desired, further augmentation may be obtained via injection of fuel and its ignition in the said thrust augmenting devices (as explained herein).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A combustor, comprising:
  a first toroidal casing circumscribing an axis and having an inlet configured to receive fluid, the first casing defining a first internal chamber in fluid communication with the inlet;
  a second toroidal casing disposed within the first internal chamber and circumscribing the axis, the second casing having an outer wall defining a second internal chamber, the outer wall having a plurality of orifices formed therethrough, the orifices providing fluid communication between the first and second chambers;
  a plurality of fuel injector elements, each fuel injector element having a first portion disposed about a first axis, a second portion disposed about a second axis and a third portion disposed about a third axis, the first axis being parallel to the second axis, the third axis being perpendicular to the first and second axes, each fuel injector element being entirely disposed between the first and second toroidal casings, each fuel injector element positioned to inject fuel into the second chamber through the orifices; and an outlet structure defining at least one channel in fluid communication with the second chamber, the at least one channel being oriented parallel to the axis.

2. The combustor of claim 1, wherein the orifices are oriented at an oblique angle with respect to the outer wall.

3. The combustor of claim 1, further comprising an ignition source positioned within the second chamber.

4. The combustor of claim 1, wherein the outlet structure comprises an inner wall converging toward the outer wall and is configured to urge high-temperature fluid flowing about the axis within the second chamber through the at least one channel.

5. The combustor of claim 1, further comprising a plurality of funnel elements disposed within the orifices and extending into the second chamber, the funnel elements tapering from the first chamber to the second chamber.

6. The combustor of claim 1, wherein the second casing comprises ceramic matrix composites.

* * * * *